(12) United States Patent
Feldman et al.

(10) Patent No.: US 6,295,272 B1
(45) Date of Patent: Sep. 25, 2001

(54) SUBCHANNEL MODULATION SCHEME FOR CARRYING MANAGEMENT AND CONTROL DATA OUTSIDE THE REGULAR DATA CHANNEL

(75) Inventors: Richard Feldman, Los Altos; Alistair Black, Los Gatos, both of CA (US)

(73) Assignee: Gadzoox Networks, Inc.

( * ) Notice: Subject to any disclaimer, the term of this patent is extended or adjusted under 35 U.S.C. 154(b) by 0 days.

(21) Appl. No.: 09/063,633

(22) Filed: Apr. 20, 1998

(51) Int. Cl.$^7$ .................................................. H04M 11/06
(52) U.S. Cl. ............................................. 370/210; 370/203
(58) Field of Search .................................. 370/203, 204, 370/205, 210, 208, 212, 215, 464, 480, 482, 401, 400, 402, 410, 431; 375/222, 242, 257, 362; 714/796, 758, 704, 752

(56) References Cited

U.S. PATENT DOCUMENTS

| | | | |
|---|---|---|---|
| 2,852,606 | 9/1958 | Curry | 179/15 |
| 3,178,515 | 4/1965 | Bramer et al. | 179/15 |
| 3,223,779 | 12/1965 | McFarlane | 178/66 |
| 3,384,822 | 5/1968 | Miyagi | 325/30 |
| 3,603,882 | 9/1971 | Wilson | 325/47 |
| 3,623,105 | 11/1971 | Kamen | 343/203 |
| 3,718,766 | 2/1973 | Stover | 179/15 |
| 4,079,203 | 3/1978 | Dragoo | 179/15 |
| 4,218,655 | 8/1980 | Johnston et al. | 455/39 |
| 4,425,642 | 1/1984 | Moses et al. | 370/76 |
| 4,677,608 | 6/1987 | Forsberg | 370/11 |
| 5,598,406 | * 1/1997 | Albrecht | 370/296 |

FOREIGN PATENT DOCUMENTS

| | | | |
|---|---|---|---|
| 28 45 598 A | 4/1979 | (DE) . | |
| 45-32486 | 10/1970 | (JP) | 325/233 |
| 52-49717 | 4/1977 | (JP) | H04J/9/00 |
| 52-69506 | 9/1977 | (JP) | H04B/9/00 |
| 56-24840 | 3/1981 | (JP) | H04J/3/04 |
| 57-18145 | 1/1982 | (JP) | H04L/5/00 |

OTHER PUBLICATIONS

Simultaneous Transmisson of Master and Slave Channel Data, D. H. Rumble, IBM Technical Disclosure Bulletin, vol. 5, No. 11, Apr. 1963, pp. 73–75.

* cited by examiner

*Primary Examiner*—Dang Ton
*Assistant Examiner*—Ricardo N. Pizarro
(74) *Attorney, Agent, or Firm*—Ronald C. Fish; Falk & Fish

(57) ABSTRACT

A method and apparatus for implementing a subchannel for management and control or other supplemental data on a media shared with a high speed data link. Several FDMA approaches are disclosed including AM, FM, PM, phase, QAM, QPSK etc. modulation of a subcarrier having a frequency which is in the bandwidth provided by the shared media which is not used by the DC balanced high speed data stream. A preferred species which is compatible with existing high speed data transmitters and receivers comprises a subchannel transmitter which frequency shift keys a subchannel carrier of about 1 mHz with the subchannel data. The modulated subchannel carrier is summed by superposition with a DC balanced NRZ format gigabit data stream and coupled onto the media. Injection power levels of the subchannel carrier are controlled so as to not cause excessive jitter in the high speed data receivers but so as to provide sufficient amplitude in the face of noise sources including random variations in transition density to be recovered by a subchannel receiver. At the destination node, the combined signal is directly coupled to the input of the high speed data receiver, but is coupled to the input of the subchannel receiver through a low pass filter. The subchannel receiver is narrowband and includes an FSK demodulator.

23 Claims, 14 Drawing Sheets

FDMA APPROACH

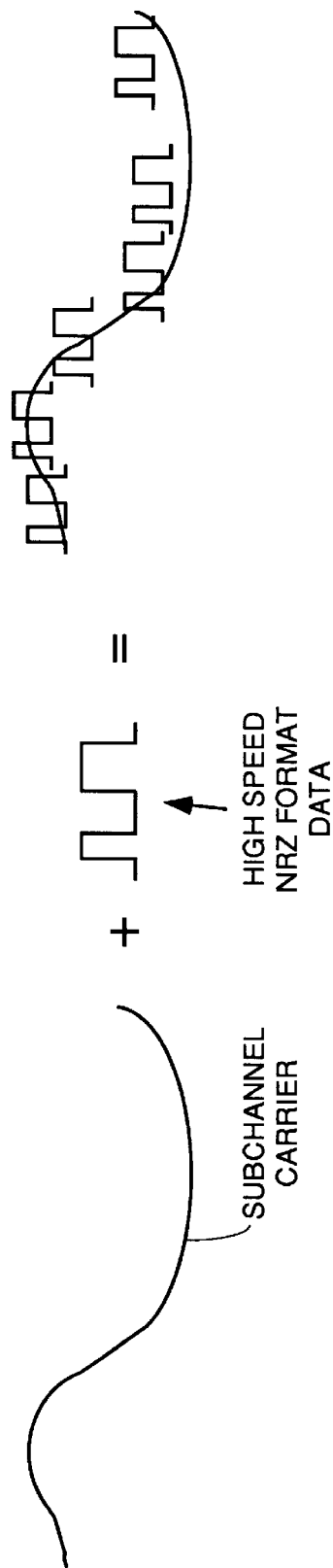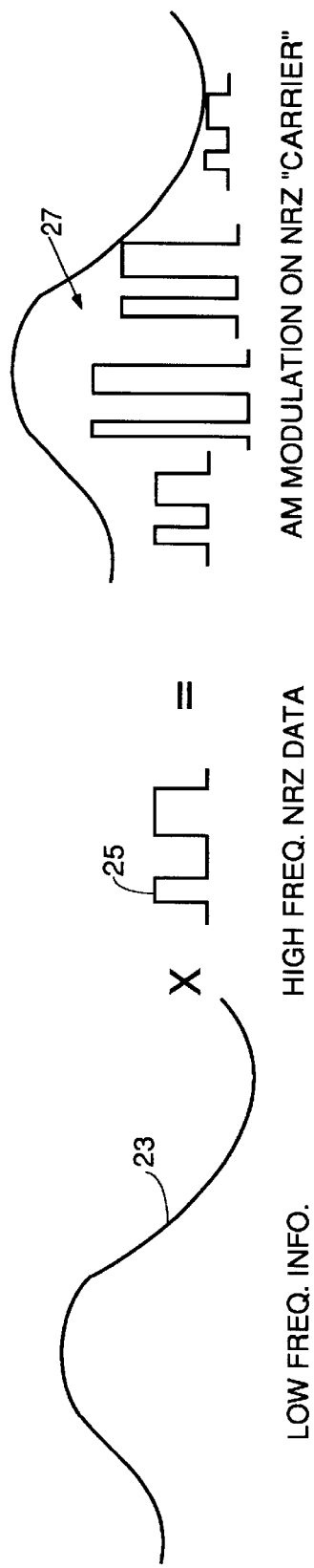

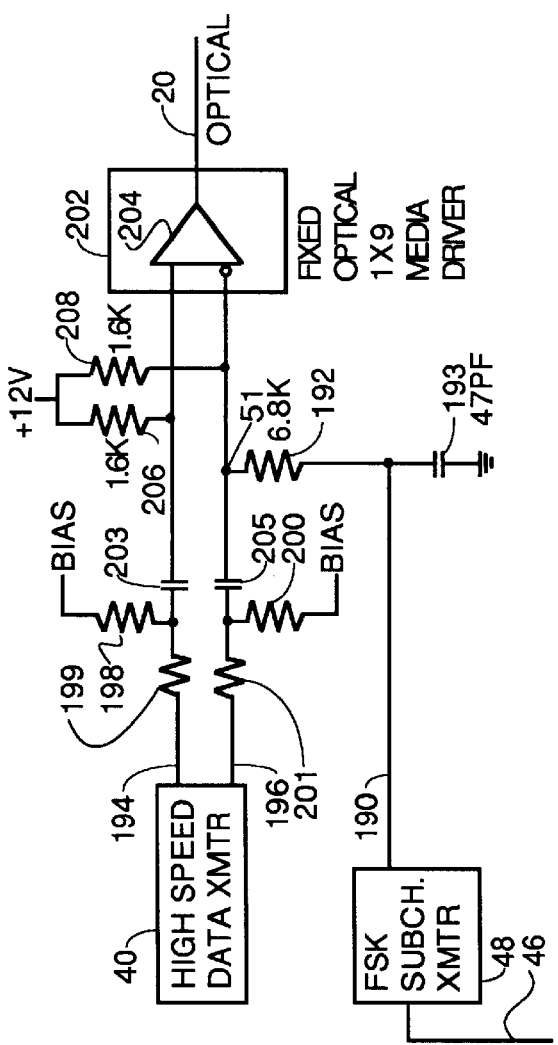
FIG. 14 M4 FIBER OPTIC
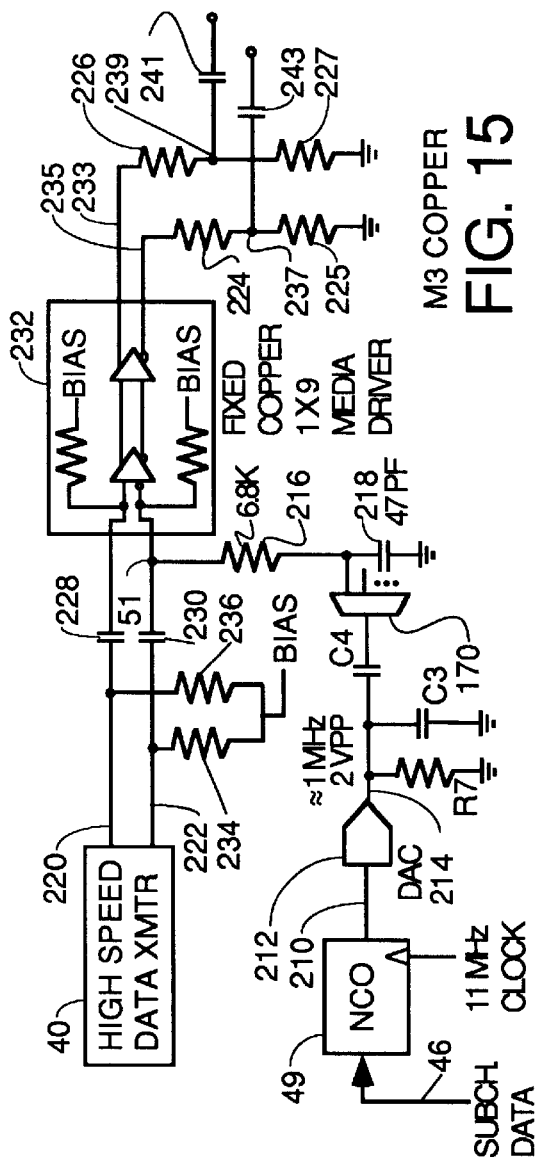
FIG. 15 M3 COPPER

PROPRIETARY LINK CLOCK MODULATED SPECIES

PROPRIETARY GENUS OPTICAL LINK RECEIVER

SUBCHANNEL VARIES BIAS

SUBCHANNEL MODULATION SCHEME FOR CARRYING MANAGEMENT AND CONTROL DATA OUTSIDE THE REGULAR DATA CHANNEL

TECHINAL FIELD

The invention pertains to the field of increasing the capacity of local area networks, bidirectional CATV systems or other systems where there is more bandwidth available in the media than is consumed by the communication protocol in use. The invention finds application also in CPU—peripheral interconnections in very large systems which may or may not be distributed by adding an out of band subchannel. Most typically the invention finds useful application in large systems having servers connected to large disk arrays where huge volumes of data must be moved and managed.

BACKGROUND ART

In many large computer systems such as are found in banks, at credit card transaction processing centers, etc., huge amounts of data must be moved and stored. Typically, very large disk arrays are used to store the data and these disk arrays are connected to file servers. These type systems require of the server/disk connection high reliability, high speed, large throughput and large bandwidth since huge amounts of information are being processed and a system shutdown or slowdown adversely impacts customers (and possibly safety in the case of large air traffic control computer systems). Because these systems can be spread out over several buildings or even if all the servers and disk arrays are within the same building, the easiest way to interconnect all the servers and disk drives for maximum redundancy is through a local area network usually with a hub having drop lines connected to all servers, disk drives and other units. Because disks fail frequently and must be replaced by redundant disks, there is a large amount of management and control traffic that must go back and forth over the server/disk array connections and through the hub to the management and control process. This management and control traffic is necessary to determine which disks are on-line, where those disks are on the network, operational disk status, how many fans are still running (because when a fan fails, the disk it cools will probably be next), what servers are still operational, network fault status, network traffic conditions and statistics, etc.

Out of band management topologies get management data to and from the hub easily enough on separate network segments, which has its own set of problems described below. However, getting management and control data to and from the disk arrays in-band is more difficult. The management and control data sits in registers on a board in the disk array. In order to get this low speed, low priority data onto the high speed data path, special circuitry must be built in each disk array which interfaces these registers to the high speed data path. This circuitry functions to collect and format the management and control data into the type of data packets used in the high speed data path and to transmit these packets with the correct communication protocol to the hub. Since the management and control data does not consume an entire packet of the size used to send data on the high speed data path, some packet space is empty and wasted . The need for this special circuitry to put the management and control data in the high speed data path makes the disk arrays more expensive and complex and placing management and control data in the high speed data packets wastes network throughput.

Some disk arrays store the management and control data on a separate disk drive which can be polled. However, this approach does not solve the problem of the need for special circuitry to get the management and control data into packets in the high speed data path and the resulting extra complexity and wasted throughput. It only allows time shifting thereby enabling transmission of the management and control data when network traffic volume is low and the throughput loss is not as significant. This time shifting is implemented by providing more storage capacity for the management and control data than is provided in the registers of the other prior art type disk arrays described above.

In some networks, management traffic is transmitted in-band by placing the management and control packets inside empty data packets and shipping these partially filled packets over the existing network connections between the server, hub and disk drives. This causes loss in throughput since the data packets are large and the management data does rot fill the data packets entirely. This leads to wasted bandwidth. Further, arbitration by the management process to have one or more packets awarded to it for management traffic and to have access to the network so that transmissions to all servers and disk drive arrays of management messages consumes processing resources and network throughput unnecessarily.

One proposal has been made in the prior art to interleave special management and control packets in with the packet stream on the high speed data path to alleviate the above mentioned problem. However, this makes the design of the integrated circuits that implement the processing on the various network protocol layers more complex and difficult. So far this approach has been a commercial failure.

Another approach that has been tried in the prior art for transmission of management and control packets is to provide an entirely separate network for the management and control data such that each server and disk array is connected to the out of band management and control process running on a separate diagnostic processor by its own network segment. This substantially increases the wiring and connection cost of the system, especially in distributed systems, as every server and disk array must have an additional network segment connected thereto. In addition, each server and disk array uses a card slot for the management and control network card which adds to the expense, complexity and failure point count of each of these units.

A multiplexing approach that has been used in the prior art to send multiple television signals over the same media is represented by U.S. Pat. No. 3,623,105. This patent teaches receiving multiple video signals and translating each one to a different channel or subband and adding all the subband signals together to form a composite signal. The composite signal is then applied to the frequency control input of a VCO having a nominal frequency of 750 mHz. The output of the VCO is applied to one input of a pulse width modulator the other input of which receives an 18 gHz carrier. The pulse width modulator serves to key the 18 gHz carrier in accordance with the period of the signal from the VCO so that what is transmitted is a train of 18 gHz waves the width of each wave or "pulse" being set by the instantaneous period of the signal output from the VCO.

Another approach to implement a subchannel or auxiliary channel over a digital communication system is represented by U.S. Pat. No. 4,079,203 to Dragoo. This patent teaches an auxiliary channel implemented on a time division multiplexed carrier system by modulating the pulse repetition rate of the digital bitstream on the transmit side of the transaction. Each transceiver transmit section includes a FIFO shift register acting as a buffer. Modulation of the auxiliary channel data is carried out by varying the rate at which the digital information of the main channel is clocked out of the FIFO shift register at the transmitting end. The modulating signal varies the pulse repetition rate of a voltage controlled multivibrator which has its output coupled to the clock out input of the FIFO shift register and to a phase comparator of a phase lock loop. Data is clocked in using a clock signal derived from the incoming serial data stream. One drawback of this system is that the capacity of the FIFO can be exceeded if the clock out rate falls substantially behind the clock in rate because of the nature of the modulating signal during certain intervals.

Another approach which has been tried in the prior art is represented by U.S. Pat. No. 4,425,642 to Moses et al. This patent teaches sending digital data simultaneously with analog signals over the same media used by an analog signal communication system such as a telephone or television video. This is done by converting the digital data into very low power multifrequency signals consisting of fundamentals and harmonics. Although the harmonics are in the frequency range of the main signals, their low power does not cause substantial interference. Complicated filter arrangements at the receiver end separate out the harmonics and fundamentals that encode the digital signals and demodulation circuitry at the receiver decodes these frequencies back into digital data. This approach is not well suited to a system where the main data flow is digital and requires complex filtering and decoding arrangements at the receiver and is therefore unduly expensive and complex.

Another approach that has been tried in the prior art is exemplified by U.S. Pat. No. 4,677,608 to Forsberg. This patent teaches a method of implementing a service channel over a fiber optic system line which carries high data rate, e.g., 34 megabits/sec, data encoded with a code the power spectrum of which is heavily suppressed for low frequencies. The low frequency section of the media bandwidth is used to transmit a service channel with a low bandwidth. The service channel signals are frequency modulated, and this frequency modulated signal carrying the service channel data is then used to pulse width modulate pulses forming the high speed data stream.

It is critical to note in fully understanding the invention that this Forsberg scheme only transmits high speed data in the RZ or return to zero format on the fiber optic media, and, if NRZ format high speed data is input to the pulse width modulator, the NRZ format high speed data is converted to RZ format high speed data for transmission on the fiber optic media by performing an AND operation with the clock, as shown in FIG. 5 (see Col. 3, lines 58–61). Either way, the RZ data is a stream of pulses (during logic 1 bit times cnly) that are pulse width modulated by the subchannel carrier signal. RZ format high speed data is not compatible with standard high speed data receivers designed in accordance with this Fibre Channel and Gigabit Ethernet standards which are the network environments in which the various species of the invention disclosed herein are intended to work. Also, with RZ data, the number of transitions from one logic state to another is approximately double the number of transitions of NRZ data over the same number of bit times. Forsberg's system pulse width modulates each pulse representing a logic 1 so he gets perturbations of the lime of crossing a reference voltage for both a rising edge and a falling edge of that pulse. With RZ data, if two consecutive logic 1's are followed by two consecutive logic 0's over four bit times, there will be a pulse with two transitions in each of the first two bit times (representing two consecutive logic 1's) and no pulses in the next two bit times. In contrast, with NRZ data for the same hypothetical, there will be a rising edge at the beginning of the first bit time and a falling edge at the end of the second bit time and no transitions during the third and fourth bit times. The critical distinction is that NRZ data has a transition density which is variable over time depending upon the content of the data while RZ data does not have a variable transition density. Since the subchannel information in Forsberg's system is expressed in the form of perturbations of the time of crossing the reference voltage on each transition of all logic 1 pulses, his system has a know and reliable number of transitions in which to send subchannel energy. Therefore, Forsberg does not have a variable transition density probleme, and teaches no circuitry to deal with the fact that where pulse width modulation is in used to carry the subchannel information, transition density variations vary the magnitude of the subchannel signal at the receiver. Because RZ data is used exclusively in the Forsberg system as the data format on the media, a much stronger and nonvarying amplitude subchannel signal is available at the subchannel receiver which is easier to detect in the presence of noise is availabe.

Forsberg's system apparently was designed to work in telephony systems built by Ericsson (the assignee of the Forsberg technology) which are not transmitting One Gigabit digital data on a local area network. This conclusion can be drawn from the teachings at Col. 2. line 65 where the subchannel data rate is indicated to be 0.3–4 kHz, and Col. 3, line 6 where the FM modulated subchannel data signal is indicated to be 35–65 kHz, and from Col. 2, line 54 where the high speed bit rate is taught to be $f_0$ and Col. 3, lines 21 and 22 where the clock rate is taught to be $f_0 = 1/T$ and Col. 3, lines 35–36 where the clock frequency is taught to be around 40 MHz.

Therefore, a need has arisen for a method and apparatus of implementing a subchannel which shares the same media as the high speed data channel and which can be used regardless of whether the media is fiber optic or copper and which can be used when the high speed data is in NRZ format with a variable transition density. The desired product will be one over which subchannel data is sent over the shared media out of band thereby not adversely impacting throughput of the network for the high speed data. Further, the preferred form of the desired product will be compatible with existing high speed data receivers and line transceivers so that no modifications thereto are required and so that the presence of subchannel data Fourier components in the high speed data signal will not increase bit error rates of the conventional high speed data receivers. Also, the desired product will not unduly complicate the circuitry at both ends of the media and will not be jammed by the high speed data transmissions.

SUMMARY OF THE INVENTION

There is disclosed herein method and apparatus for implementing a subchannel for management and control or other supplemental data on a media shared with a high speed data link. The species disclosed herein fall into either of a first or second genus. Both classes share the common characteristic that the subchannel data can be sent out of band over the high speed data media without substantially increasing the bit error rate of the high speed data receivers. All the specific species disclosed herein for subchannel transmitters and receivers could also be implemented using suitably programmed digital signal processors.

The preferred genus has as a principal characteristic that all species therein are backward compatible with existing high speed data transmitters, media interface devices and high speed data receivers and do not require any changes thereto nor does the existence of the subchannel signals degrade the bit error rate of the high speed data transmissions. This means, among other things that no access to the internal circuitry of the high speed data receivers or media transceivers is necessary to make changes to implement the subchanriel scheme, and, further, that data is transmitted in the format which the high speed data receivers are designed to understand (NRZ for 1 GB Ethernet™ and Fibre Channel™ standards). In contrast to the Forsberg prior art (U.S. Pat. No. 4,677,608), no species within the preferred genus of the invention transmits RZ data as that would be incompatible with all existing gigabit receivers for Fibre Channel or One Gigabit Ethernet LANs. All species in both the backward compatible and proprietary link classes transmit the combined high speed data and subchannel signal in NRZ format with the high speed. data encoded with a DC balanced encoding scheme. Further, all species in the backward compatible genus which depend solely upon pulse width modulation to transmit the subcarrier signal also require that the encoding scheme have a bounded transition density which will never fall below a certain figure (0.3 for 8b/10b encoding meaning for 10 bits of 8b/10 encoded data there is guaranteed to be at least 3 transitions and could be up to 10) regardless of the content of the data. The reason for this is that the amplitude of the subchannel signal at the subchannel receiver in all species which rely solely on pulse width modulation is directly proportional to the transition density of the high speed data. This varies with the content of the data, so the amplitude of the subchannel signal can fall lower or go higher than the nominal values depending upon the gigabit data content. In contrast, the RZ format described in the Forsberg prior art reference has an essentially constant transition density. Further, if too much subchannel energy is injected, excessive jitter in the high speed data receiver is caused which can cause bit errors or loss of lock. High speed data receivers can withstand 60–70% eye closure on bit times caused by jitter before losing synchronization. These issues of excessive jitter and subchannel amplitude that is dependent upon transition density and the need for an encoding scheme with a bounded transition density are issues that Forsberg does not recognize and upon which he adds no teachings to the content of the prior art.

Another significant characteristic that all species in this preferred backward compatible genus shares is that where alteration of the times of reference voltage crossings is the mechanism by which the subchannel data is transmitted through digital buffers in the media interfaces, the subchannel carrier amplitude actually summed with the high speed data will have to be limited to prevent excessive jitter in the high speed data receivers causing loss of synchronization lock. Every device in a subchannel system contributes some jitter. Fibre Channel systems allow up to 500 picoseconds of jitter in one gigabit systems. The preferred subchannel species disclosed herein are designed to contribute to the system jitter budget approximately 15 picoseconds of jitter or less in the high speed data receiver caused by injection of the subchannel signal. To sum up this principal characteristic of the preferred genus, the subchannel circuitry, modulation scheme and subchannel carrier amplitude and all other characteristics must be such that the high speed data link behavior works the way it has always worked and is independent of the presence or absence of subchannel circuitry on the transmitter or receiver end and requires no changes to the circuitry of the high speed data transmitter or receiver or any of the media interface devices. Species in the preferred genus do not use modulators that modulate the high speed data with the subcarrier data. The subchannel data is simply summed with the high speed data and picked off at the receiver side using a low pass filter and narrow band receiver tuned to the center frequency of the subchannel carrier. There is no demodulation of the subchannel data from the high speed data at the receiver side in the preferred species and no pulse width demodulator is used. The preferred species simply discriminate the FSK modulated subchannel carrier to recover the subchannel data. By not using a pulse width demodulator, the detection margins are smaller, but the circuit is less complex. Generally, angle modulation techniques such as phase or frequency shift keying of the subchannel carrier by the subchannel data works better than amplitude modulation techniques. This is because of the backward compatibility issue and because of the amplitude modulation caused by random variations in transition density with NRZ format high speed data content.

The other defining characteristics of the preferred backward compatible genus are as follows.

First, the subchannel link is compatible with standard media interface components and modules for either compensated copper, uncompensated copper or fiber optic media types. This means that with suitable adjustments of injection amplitude (or use of a two value attenuator) and injection type (differential or single ended), the subchannel circuitry can be used with either copper alone or fiber alone or with GBIC modules for field interchangeability between either copper or fiber.

Next, the high speed data stream is in NRZ format and is encoded with a code such as 8b/10b which is DC balanced so that at frequencies around the subchannel carrier frequency there is much less energy content in the Fourier spectrum components than in the higher frequency components. The subchannel data is used to modulate a subchannel carrier which is within the link passband (including any lower frequency limitations caused by DC blocking capacitors used for AC coupling) and is also in the portion of the low frequency portion of the spectrum of the high speed data which is heavily suppressed by the DC balanced encoding.

Further, the high speed data encoding scheme must have a bounded transition density which never falls below a worst case value for the preferred genus which achieves backward compatibility by, among other things, using pulse width modulation of the high speed data to transmit the subchannel data. Transition density need not be bounded for non-PWM species either within or without the preferred compatible genus. Transition density boundaries are needed in PWM-based species because in the preferred genus, the subchannel carrier modulated with the subchannel data is added to the high speed data stream which causes the. information of the subchannel data to be expressed in the combined sum waveform as both amplitude changes and pulse width modulation (PWM). This PWM results from shifts in the time of passage of the rising and falling edges of the data transitions in the NRZ format data across a discrimination threshold such as a zero crossing (hereafter, zero crossing may be used to refer to the time of crossing of a leading or trailing edge with non-zero rise time across a voltage reference even though the reference voltage may not be zero). However, because of compatibility requirements of the preferred genus, this combined waveform is usually passed through a digital buffer at the transmitter media driver or the receiver media interface or both. The digital buffer blocks any amplitude variations at the input from getting to the output other than to pass the logic 1's and 0's. In other words, the media driver and the receiver media interface regenerate the logic signals at their outputs at defined logic levels regardless of deviations from these standardized levels at the inputs. Thus, the subchannel data gets through the media only in the form of the alteration of the zero crossing times of the transitions in the NRZ high speed data signal, a form of pulse width modulation, since these alterations of the zero crossing times can pass through as many digital buffers as are needed without being lost. However, this means that the entire energy of the subchannel data spectrum is expressed in the alterations of the zero crossing times of the high speed data transitions, so a minimum transition density must be guaranteed by the encoding scheme so that sufficient energy of the subchannel spectrum gets through the media to provide sufficient amplitude of the subchannel signal at the subchannel receiver to enable it to be detected in the presence of noise. The noise in the subchannel receiver acting as an impediment to detection of the subchannel signal has three principal components and other minor components. The principal components are: (1) the amount of energy in the Fourier spectrum components of the high speed data generally within the bandwidth of the low pass filter in front of the subchannel receiver; (2) electromagnetic interference picked upon in the subchannel receiver past the low pass filter in the frequency range of the subchannel carrier from all sources including the clock and the Fourier components of the high speed data; and, (3) random variations in received subcarrier amplitude caused. by. changes in transition density of the NRZ format high speed data. The amount of energy in the spectrum of the high speed data in the passband of the low pass filter depends upon the data pattern of the high speed data and varies with that data pattern as does the transition density. Generally, the subchannel signal is about 30–40 dB down from a reference level set at the full power of the gigabit transmitter, so transition density and the amount of noise present play a significant role in whether or not subchannel data can or cannot successfully be transmitted through digital buffers in a fully compatible system.

The high speed data usually has a bit rate of 1 GB or faster although the data rate of the high speed data stream is not actually intended to be a claim limitation or a defining characteristic of the preferred genus.

The preferred species within the preferred backward compatible genus is designed for use with GBIC media interface technology and a selectable attenuator such that it can be used with either copper or fiber optic media. Switching of the media in the field can be donle by changing the GBIC media adapter to the type used by the desired media and by adjusting the level of attenuation of the subchannel carrier so as to obtain acceptable levels of jitteir in the high speed data receivers. The required attenuation of the subchannel carrier amplitude is greater in the copper media case than for the fiber optic case.

One preferred species in the backward compatible genus of the invention uses frequency shift keying modulation of the subchannel carrier and mixes the subchannel carrier so modulated with the high speed data pulse train by addition or superposition. This causes amplitude modulation of the amplitudes of the pulses of the high speed data pulse train because the frequency of the subchannel carrier is so much lower than the 1 GB frequency of the high speed data. This amplitude modulation will be passed through to the media and the high speed data and subchannel receivers on the opposite end of the link if analog line drivers are used, so transition density of the high speed data would not be an issue in such a species. However, If any digital line driver for either copper or optical media is interposed between the summing junction and the media itself, the resulting amplitude modulation of the high speed data pulses does not survive transition through the digital line driver since the output voltage levels of a digital driver are not a function of the input voltage levels arid is only a function of whether the input is a logic 1 or 0. In this case, the only effect of the presence of the subchannel data is pulse width modulation of the high speed data pulses. Transition density of the high speed data then becomes a key factor in whether or not sufficient energy from the subchannel data gets through to the subchannel receiver to be detected.

One of the preferred species involves using separate subchannel data as an input to an FSK transmitter to alter the frequency of a subchannel carrier having a frequency of abolt 1.152 mhz between separate mark and space frequencies using a phase accumulator and a sin(x) lookup table to generate a plurality of digital values which are input to a video speed digital to analog converter to generate the FSK modulated carrier. This frequency was selected in a design change to help alleviate a noise problem in the 500–750 kHz range that non-GBIC 1-of-9 optical media receivers had which clobbered the original subchannel carrier signal in the same range. The FSK modulated subchannel carrier is then passed through a low pass filter to smooth out the sine wave and then is applied to a summing junction through variable attenuator which has one attenuation value for optical media and another attenuation value for copper media. The attenuation is necessary to control the amount of jitter in the high speed data at the high speed data receiver caused by the presence of the subchannel data so that the amount of jitter caused does not exceed the ability of the high speed data receiver to continue to stay in synchronization with the high speed data. More attenuation is applied for copper media because of the tendency of skin effects in copper media over long runs of cable to flatten out the leading and trailing edges of the high speed data transitions. The greater attenuation of the subchannel carrier in the copper media case prevents the amount of jitter at the high speed receiver from becoming too great.

This variable attenuator and use of a subchannel carrier frequency of approximately 1 Mhz are characteristics of all species using GBIC media drivers to couple the combined signal into either fiber optic or copper media at the choice of the technician in the field.

A less expensive, preferred FSK type transmitter for species within the preferred backward compatible genus uses a four bit counter to count a clock which is 16 times the subcarrier center frequency and an up/down 4-bit counter to count a clock which is 16 times the FSK deviation frequency. The subchannel data itself is applied to the up/down control input of the up/down counter to control whether it counts up or down. The resulting 4 bits are added to the 4 bits from the counter counting the subchannel carrier clock by a digital adder. The result is a stream of digital numbers the MSB of which defines a different number of cycles over a given time when the subchannel data is a logic 1 than when it is a logic 0. The stream of digital numbers representing the phase of the subchannel signal is used to address a sine ROM and the output is applied to a DAC with a low pass filter used to smooth out the result. The resulting signal is added directly to the high speed data through the variable attenuator.

Another preferred low cost FSK transmitter uses a dual modulus divider which counts a clock having a frequency which is the lowest common multiple of the mark and space frequencies. The divisor value is controlled by the subchannel data.

In addition to the preferred species, there are disclosed several species in a non-backward compatible genus which use an FDMA approach. These alternative embodiments including AM, FM, PM, phase, QAM, QPSK etc. modulation of a subcarrier having a frequency which is in the bandwidth provided by the shared media which is not used by the DC balanced high speed data stream. Other FDMA approaches are phase, amplitude or frequency modulation of the high speed data clock with the subchannel data before NRZ encoding of the high speed data 8b/g10b encoded baseband signal, and use of different phase locked loops at the receiver end to recover the high speed data clock and recover the subchannel data from the clock.

Several optical fiber species of the invention are disclosed showing how a subchannel modulation signal may be summed with the high speed data modulation signal to drive a laser diode and how the signals may be separated by FDMA techniques at the receiver end, and how the subchannel modulation may be added to the stabilization bias circuit of the laser diode in another FDMA approach.

Also disclosed are the preferred forms of FDMA approach coupling of a subchannel modulated subcarrier signal to a high speed data modulated carrier signal at both the receiver and transmitter ends to prevent coupling of high speed data into the low speed data input port and vice versa.

Also disclosed are a receiver end coupling to prevent reflections while separating the signals by using a lowpass filter while allowing very small subchannel power to be used for the subcarrier while still enabling the use of inexpensive TTL components to process the subchannel signals.

At the receiver end, the signals are separated by coupling the combined signal to the high speed receiver directly and coupling the combined signal to a subchannel FSK receiver through a low pass filter.

BRIEF DESCRIPTION OF THE DRAWINGS

FIG. 4 illustrates the combined signals on the shared media where, by superposition, the subchannel and high speed data signals are simply added to each other.

FIG. 5 illustrates another possibility where the instantaneous value of the subchannel data, represented as the low frequency waveform 23, is used to multiply the amplitude of the pulses of the NRZ high speed data to get NRZ high speed data which has an amplitude for each bit time which depends upon the amplitude of the subchannel waveforirn during that bit time.

FIG. 14 shows a species in the backward compatible genus of a subchannel transmitter injection network for use with fiber optic media and a fixed optical 1×9 media transceiver.

FIG. 15 shows a subchannel transmitter injection network for use with copper media and a fixed copper 1×9 media transceiver.

DETAILED DESCRIPTION OF THE PREFERRED EMBODIMENT

Figure 1:
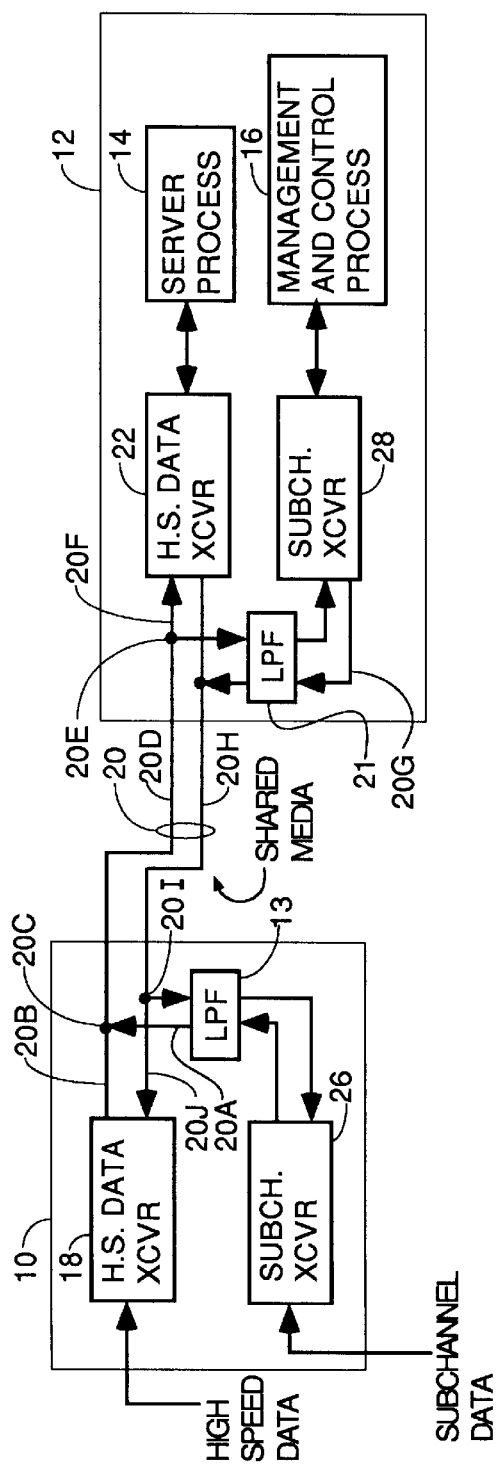
FIG. 1 is a block diagram illustrating the general idea and a generic implementation of the invention.
Figure 2:
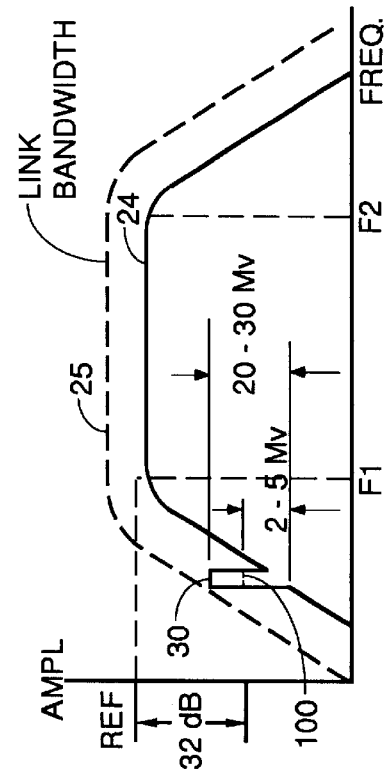
FIG. 2 is a graph of the relative spectra of the management and control information in the subchannel relative to the spectra of the high speed data.

Referring to FIG. 1, there is shown a block diagram of a system representing the overall genus of including special subchannel transceivers that can send and receive management and control data, etc. over an out-of-band subchannel while sharing the high speed data path media with the high speed data. FIG. 2 illustrates the basic spectral utilization according to the teachings of the invention. The invention finds utility in any communications network or local/distributed high speed computer system having high speed data links between one or more nodes and/or hubs and high speed data peripherals where the data encoding scheme in use is DC balanced. DC balanced data encoding schemes such as 8b/10b are DC balanced which means that the low frequency portion of the Fourier spectrum of the encoded high speed data is heavily suppressed, i.e., the high speed data spectrum 24 in FIG. 2 does not consume the entire link bandwidth 25 available through the media and its media interface drivers. The invention is useful in systems where there is a need for out-of-band management and control or other traffic in addition to the high speed data so that the overhead management and control traffic does not reduce throughput for the high speed data.

Fundamentally, any type of subchannel system that can communicate data bidirectionally or unidirectionally using a portion of the bandwidth provided by the media which is not carrying much energy of the high speed data spectrum which uses any modulation scheme not found in the prior art of subchannel systems falls within one of the two classes of species that define the invention.

In a real network system, each server, hub, disk drive and other units to be managed or controlled would have its own built in subchannel transceiver. For simplicity in FIG. 1, only two separate units 10 and 12 of a network are shown. Typically, unit 10 would be a RAID or JBOD multidisk standalone disk drive or hub and unit 12 would be a server which would have a server process 14 and a management and control process 16 in execution thereon. Alternatively, unit 12 would be another hub with only a management and control process in execution thereon. High speed data from disk drive 10 would be sent by a known high speed data transceiver 18 over shared media 20 (consisting of two pairs of conductors, one pair for each direction) to another known high speed data transceiver 22 in the server. The transceivers 18 and 22 and other associated circuitry implement known protocols for transmission of the high speed data by accessing, buffering, packetizing, modulating, transmitting, receiving, demodulating, depacketizing, buffering and passing the high speed data to the server process for utilization. The details of the bidirectional transmission of the high speed data are not important other than to note that the encoding scheme for the backward compatible and proprietary link genus must suppress the amount of energy in the low frequencies enough to allow a weak subchannel signal in the low frequency range to be detected.

The type of spectrum shown at 24 in FIG. 2 is typical of 8b/10b encoding. This encoding scheme was invented and patented by IBM, and creates a DC balanced transmission through a serial link. In the case of Fibre Channel, an ANSI defined standard for communication between peripheral devices, this means that the vast majority of the energy in the spectrum of the high speed data is in the bandwidth of the link above about 50 mHz. There is energy from the high speed data down in the subchannel carrier frequency range of from 500 kHz to about 1 mHz, but the levels of this energy are low enough to allow the subchannel spectrum 30 to be detected.

This subchannel detectability issue give rise to another requirement for the encoding scheme for species within the backward compatible genus which pass the subchannel spectrum energy through the link in the form of perturbations of the zero crossing times of the high speed data transitions. For these species, the transition density of the high speed data must be bounded so as to not fall below a certain limit (0.3 for 8b/10b encoded data). The reason for this is that the amplitude of the subchannel data frequency components in the subchannel spectrum, shown at 30 in FIG. 2, depends upon transition density. In the backward compatible genus, the subchannel carrier modulated with the subchannel data is simply added to the high speed data signal to created a combined signal. This combined signal has both amplitude variations caused by the addition of the subchannel carrier and also has pulse width modulation caused by perturbation of the zero crossing times of the leading and trailing edges of the high speed data transitions. When this combined signal is passed through digital buffers such as are commonly found in media interface drivers for both copper and fiber media, the amplitude changes in the combined signal do not survive. Only the pulse width modulation caused by the leading and trailing edge perturbations survive. Typically, the amplitude of the subchannel spectrum components in the combined signal before passing through any digital buffers is about 20–30 millivolts. When the amplitude variations are lost after passing through a digital buffer, the amplitude of the components in the subchannel spectrum drops to about 2–5 millivolts, as symbolized by the dashed line through spectrum 30. This means that relative to the full amplitude of the high speed data spectrum components, shown as the reference level REF in FIG. 2, the amplitude of the subchannel spectrum components is about 32 dB down for the average transition density of 0.6 of 8b/10b encoded data. However, the transition density of real gigabit data can vary between 0.3 and 1.0 but rarely gets above 0.8. This means that the amplitude of the subchannel spectral components in the backward compatible genus species is quite small and variable with the transition density variability of the actual high speed data being sent. Therefore, it is difficult to successfully detect the subchannel signal, and suppression of noise in the subchannel carrier frequency region and the subchannel carrier frequency which is selected are important issues.

Typically, for 8b/10b encoded data at 1.0625 gHz, the 3 db rolloff point of the Fourier power spectrum, frequency F1 in FIG. 2, is at 40–50 mHz, and the upper 3 db rolloff point at frequency F2 in FIG. 2 is at 1.0625 gHz. With appropriate filtering and other techniques at both ends of the channel, the two protocols, e.g. Fibre Channel for the high speed data and RS232 for the subchannel, may share the same transmission link but operate independently as if the other was not there. This has several advantages. First, the same transmission media may be used for both sets of data, thus reducing wiring costs and complications. Second, since the constraints of multiple connections are removed, a higher level of integration may be achieved on the adapter card or inside the peripheral. Third, network management operations such as diagnostic data collection and connection management may proceed out-of-band without adversely. affecting the high speed data link throughput.

In 8b/10b encoding, symbols are 10 bits long and are encoded using rules that prevent excessively long runs of 0's or 1's from existing in the string of transmitted symbols thereby negating the possibility of any average DC component. Transition density is bounded to be no less than 0.3 and 1.0 and averages about 0.6 and rarely gets above 0.8. The 8b/10b encoded symbols are then transmitted in NRZ format on the shared media. The, 8b/10b encoding protocol is DC balanced and is an example of the type of encoding protocol which results in a spectral power distribution like that shown as spectrum 24 in FIG. 2 with heavily suppressed energy content below about 50 mHz. Since management and control data typically involves data transfer at a maximum of about 200 kilobits/second, the bandwidth from 0 to about 50 mHz is more than enough to accommodate a subchannel of management and control data since NRZ modulation spectral efficiency is about 2 bits/Hertz. Ethernet protocols have a maximum speed of 10 megabits/sec (conventional Ethernet). Thus, in some species of subchannel technology, an entire Ethernet channel could be transmitted on the subchannel consuming no more than 10 mHz, although it is doubtful this could be accomplished with species within the backward compatible genus. In some embodiments therefore, the subchannel transceivers 26 and 28 can be implemented with standard Ethernet interface circuitry in addition to the subchannel modulation circuitry.

The management and control data in the system of FIG. 1 is modulated onto a subchannel carrier by separate subchannel transceivers 26 and 28. In the case of transmission of management and control data from disk unit 10 to server 12, subchannel transceiver 26 modulates the management and control data onto whatever base signal is being used to carry the data over the shared media 20. Subchannel transceiver 28 receives the base signal and demodulates the management and control data therefrom and passes it to the management and control process 16.

Figure 3:
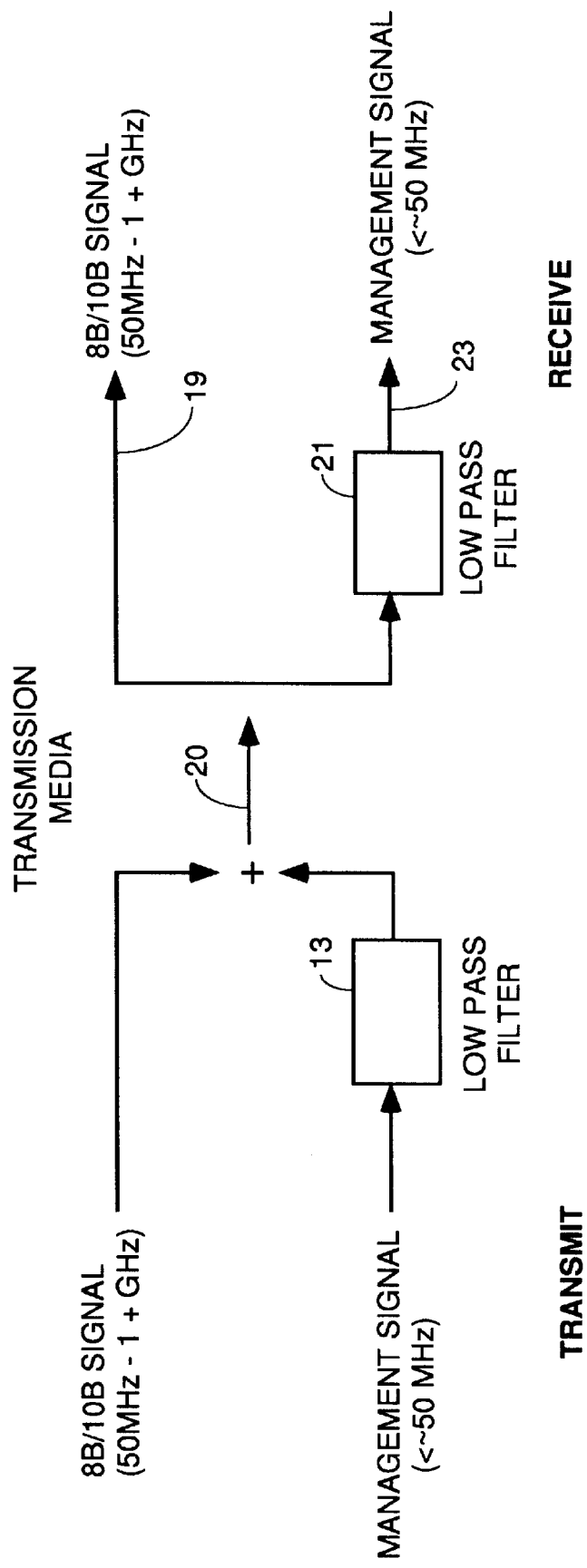
FIG. 3 shows a generic block diagram of the type of filtering arrangement needed on the transmit side and receive side to separate the high speed data from the subchannel data for an 8b/10b encoded high speed data stream.

FIG. 3 shows a generic block diagram of the type of filtering arrangement needed on the transmit side and receive side to separate the high speed data from the subchannel data for an 8b/10b encoded high speed data stream for species within the backward compatible genus. On the transmit side, the incoming 8b/10b encoded high speed data is passed straight through to the media without filtering so as to not distort the high speed data by removing any of its lower frequency components. The management and control data for the subchannel is passed through low pass filter 13 which blocks substantially all Fourier components above the cutoff frequency of the filter from travel in either direction and also smoothes out the subchannel signal in embodiments where it is digitally generated using a DAC. The output of the filter 13 is summed with the high speed data signal by superposition at a summing node and transmitted over shared media 20.

At the receiver, the high speed data is sent directly to the high speed data receiver without filtering. The subchannel spectral components 30 are separated from the combined signal by low pass filter 21, and the filter output is sent to a subchannel receiver via line 23. In FIG. 1, low pass filters 13 and 21 are also shown, but they each comprise two individual low pass filters, one for the media travelling in each direction.

FIG. 4 illustrates the combined signals on the shared media where, by superposition, the subchannel carrier and high speed data signals are simply added to each other. FIG. 5 illustrates another possibility where the subchannel data, represented as the low frequency waveform 23 is multiplied times the NRZ clocked data 25 to get NRZ high speed data which has an amplitude for each bit time which depends upon the amplitude of the subchannel waveform during that bit time. The scheme of FIG. 5 will also work in the backward compatible genus since it is amplitude changes of the pulses of the high speed data which cause the perturbations of the zero crossing times of the leading and trailing edges. The type of modulation illustrated by FIG. 5 is not preferred since it causes more distortion on the high speed data train thereby causing interference in the high speed data channel from the subchannel. However, the modulation scheme of FIG. 5 can be particularly useful when there is an automatic gain control circuit in the receiver which can then double as a demodulator for the subchannel.

There are many ways of implementing the subchannel transceivers 26 and 28 including but not limited to AM modulation of a subcarrier, FM or PM modulation of a subcarrier, etc. In addition, the control loop for laser power control may be used to implement a subchannel with careful design by altering the laser bias with the subchannel data to cause a form of amplitude modulation of the laser pulses which happens after the digital buffer of the media interface circuitry in front of the laser. However, these amplitude modulation perturbations would be filtered out by the digital buffer at the receiver side again leaving only leading and trailing edge perturbations. The diagram of FIG. 1 is intended to illustrate all species of all three genus'.

Figure 6:
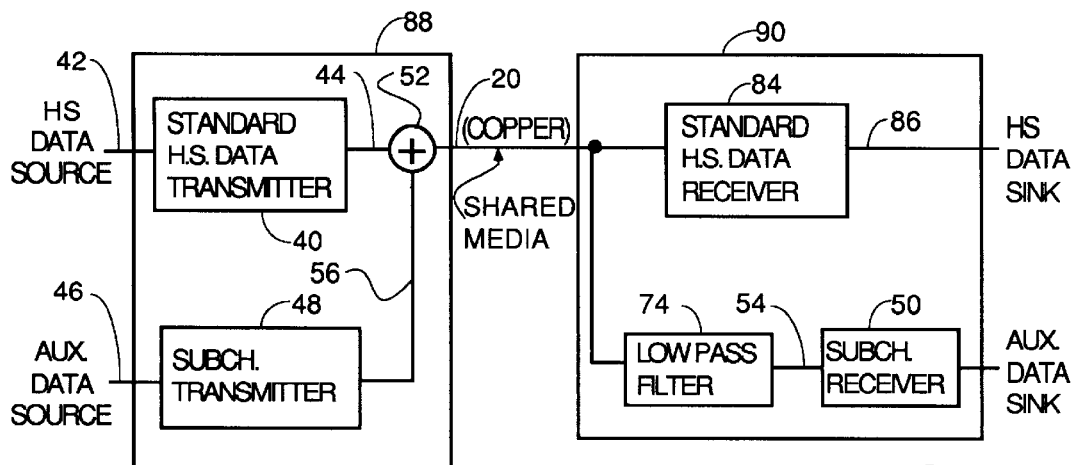
FIG. 6 illustrates one species of a subchannel system in the backward compatible genus wherein copper shared media 20 is used and no limiting drivers or digital buffers are present to "filter" out amplitude changes in the combined signal and a linear subchannel receiver is used.

Referring to FIG. 6, there is shown a block diagram of one species of a subchannel system wherein copper shared media 20 is used and no limiting drivers or digital buffers are present to "filter" out amplitude changes in the combined signal and a linear subchannel receiver is used. An example of such a species would be where the combined signal generated at the output of a summing junction 52 was launched directly into a compensated or uncompensated copper media 20 using a passive GBIC interface (not shown) with no digital buffer stage therein and including only AC coupling capacitors. Another example is a copper media species where no GBIC technology is used and the combined signal from the summing junction is launched directly into the copper media through an AC coupling capacitor (not shown). AC coupling capacitors would be used in both these examples on the receiver side, but no media interface receiver or GBIC technology would be interposed between the media and the high speed data receiver.

In the embodiment of FIG. 6, a standard prior art high speed data transmitter 41) receives high speed data on bus 42 and outputs an NRZ waveform of 8b/10b encoded data having a data rate of 1.0625 gigabits per second on line 44 (the data rate and type of encoding can varies from species to species within the subclass represented by FIG. 6). The subchannel data in the form of an asynchronous binary data stream having a low data rate, typically 9600 baud, arrives on line 46. In the preferred embodiment, the subchannel data follows the RS-432 standard and is not DC balanced in that it can spend an arbitrary amount of time in the mark state before switching back to the space state. A subchannel transmitter 48 preferably converts the auxiliary data into a frequency-shifitkeyed subcarrier with a center frequency of from about 500 kHz to about 1.5 mHz. This range is not exclusive and any frequency for the subchannel carrier giving adequate signal to noise ratio at a subchannel receiver 50 will suffice. FSK is not the only form of modulation that can be used in the subchannel transmitter. Any other form of modulation such as amplitude modulation etc. can also be used which cause either amplitude, frequency or phase variations of the subchannel carrier in accordance with the subchannel data. This is true since there are no amplitude excursion limiting circuits such as digital buffers present after the summing junction 52 or before the input 54 of the linear subchannel receiver 50 in species of this subclass which would limit transfer of the subchannel information to only perturbations of the zero crossing times of the leading and trailing edges of pulses in the high speed data signal. Preferably, the subcarrier frequency is 1.152 mHz and the FSK is used which shifts this frequency plus 29 kHz for logic 1 and minus 29 kHz for logic 0. The voltages of the modulated subcarrier on line 56 are added to the voltages of the high speed data signal on line 44 in summing junction 52, and the combined signal is launched directly into shared copper media 20 without the need for any media interface.

Figure 7:
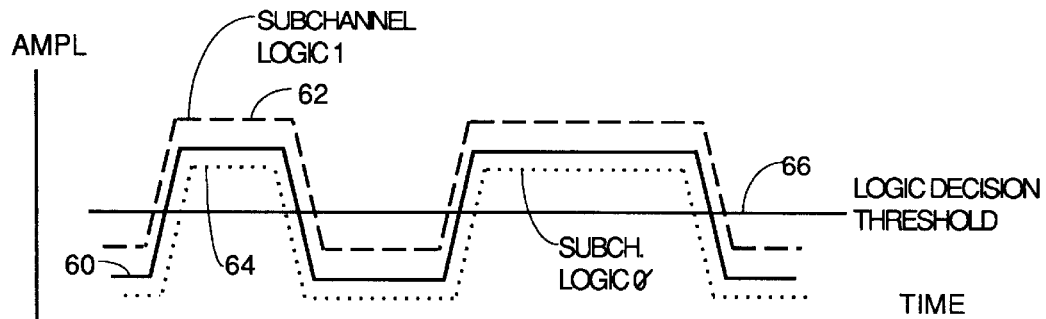
FIG. 7 illustrates the combined signal on shared media 20 resulting from the superposition at summing node 52 of the modulated subcarrier and the high speed data signal.

FIG. 7 illustrates the combined signal on shared media 20 resulting from the superposition at summing node 52 of the modulated subcarrier and the high speed data signal. This figure is applicable regardless of what type of modulation scheme is being used in all species using addition of the subcarrier to the high speed data at a summing node.

Figure 8:
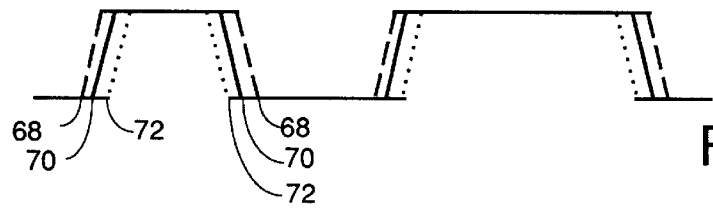
FIG. 8 shows the effect of passing the combined signal of FIG. 7 through a digital buffer.

Because the frequency of the subcarrier is so much lower than the bit rate of the high speed data, during any pulse interval in the NRZ high speed data, the subcarrier voltage appears to the high speed data as a constant value which either increases the amplitude or decreases the amplitude of the NRZ pulse. The NRZ high speed data signal on line 44 is shown as waveform 60. Waveform 62 represents the combined NRZ signal on media 20 when the subcarrier is in a positive half cycle. Waveform 64 represents the combined NRZ signal when the subcarrier is in a negative half cycle. Reference voltage 66 represents the logic decision threshold that is used on the receiving end to decode whether the voltage of the combined signal on media 20 is a logic 1 or logic 0 during any particular bit time. For copper media, this logic decision threshold is usually 0 volts. For fiber optic media, it is usually ½ power where the highest amplitude in the waveform is defined as full laser power and the lowest amplitude in the waveform is defined as 0 laser power. Note how the amplitude variations also perturbs the times of crossing of the logic decision threshold at both the leading and trailing edges of each NRZ transition because of the non-zero rise and fall times of these transitions. FIG. 8 shows the effect of passing the combined signal of FIG. 7 through a digital buffer. The digital buffer removes the amplitude variations and leaves only the perturbations of the times of crossing of the logic decision threshold. Waveform 68 represents the resulting combined waveform during positive half cycle of the subcarrier waveform and waveform 72 represents the resulting combined waveform during a negative half cycle of the subcarrier waveform. Waveform 70 is the resulting combined waveform when no subchannel carrier voltage is present. It is apparent from FIG. 8 that the subchannel information in cases where limiting digital buffers are present between the summing junction and the subchannel receiver is passed via only pulse width modulation of the NRZ format high speed data. The pulse width modulation of the NRZ signal caused by the subcarrier shown in FIG. 8 appears to the high speed data receiver as jitter. Therefore, it is important to limit the amplitude of the subcarrier injected into summing junction 52 so as to limit the amount of jitter seen by the high speed data receiver to an amount that is tolerable and which will not cause loss of synchronization lock by the high speed data receiver.

Figure 9:
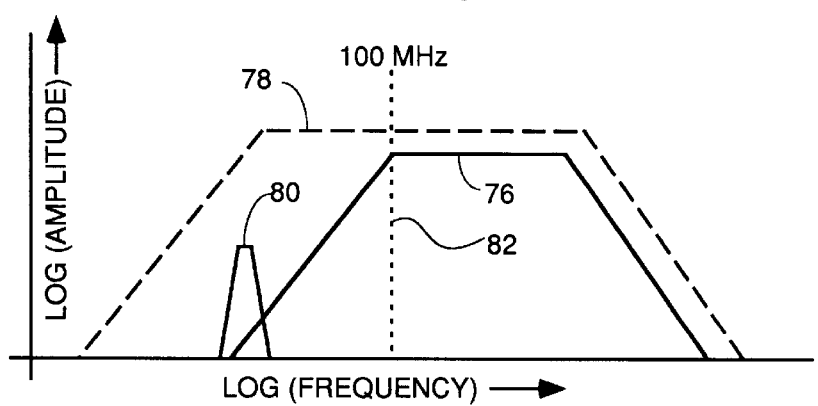
FIG. 9 shows the relationship between the Fourier spectrum 76 of the high speed NRZ data, the bandwidth 78 of the link, and the Fourier spectrum 80 of the subchannel signal for one gigabit NRZ 8b/10b encoded data and a subchannel carrier frequency of approximately 1 mHz.

Returning to the consideration of the receiver side of the system of FIG. 6, the combined signal on shared media 20 is applied directly to the input of a conventional high speed data receiver. Also, the combined signal is applied to the input 54 of a linear subchannel receiver 50 through a low pass filter 74 which functions to separate the subchannel signal from the high speed data signal and prevent the high-power, high-speed data signal from overwhelming the subchannel receiver. FIG. 9 shows the relationship between the Fourier spectrum 76 of the high speed NRZ data, the bandwidth 78 of the link, and the Fourier spectrum 80 of the subchannel signal for one gigabit NRZ 8b/10b encoded data and a subchannel carrier frequency of approximately 1 mHz. The bandwidth 78 of the link rolls off at some frequency above zero because of AC coupling requirements. The 3 dB rolloff 82 of the spectrum of the high speed data is at about 100 mHz, but the energy in the high speed data spectrum in the vicinity of the subchannel carrier is nonzero.

In the embodiment of FIG. 6, the amplitude of the frequency components in the subchannel spectrum 80 must be sufficiently high to be detectable over the noise from the high speed data signal that gets through low pass filter 74, but not so high as to cause excessive jitter in the high speed receiver 84. Excessive jitter is defined as enough to cause either an unacceptably high bit error rate in the recovered high speed data stream on line 86 or loss of synchronization by the high speed data receiver. The amplitude variations caused by addition of the subcarrier signals directly affect the amount of jitter. Thus, the amplitude of the subchannel carrier on line 56 must be controlled so as to get sufficient amplitude to detect the subchannel signal without causing excessive jitter. Where the amplitude variations get through the link, this is easy since more subchannel signal energy gets through the link in the embodiment of FIG. 6 than in embodiments were digital buffers are present to remove the amplitude variations and leave only pulse width variations.

Note also, that the spectrum of the high speed data varies with the pattern of the high speed data, and, in species in the backward compatible genus where pulse width modulation is the only mechanism by which the subchannel data is transmitted across the link, the amplitude of the subchannel components depends upon the transition density of the high speed NRZ signal which depends upon the actual data being sent, but which is bounded to be no lower than 0.3 by the 8b/10b encoding. More transitions mean more energy of the subohannel signal gets through the link and translates to greater amplitude of the subchannel signal at the receiver. Therefore, the amplitude of the components in the subchannel spectrum 80 also depend upon the encoding scheme in use and the content of the high speed data stream and loss on the shared media in addition to the injection amplitude of the subchannel carrier on line 56.

Because one example of a species in accordance with the teachings of FIG. 6 is use of a known passive GBIC, there is the possibility that a user may try to use the subchannel technology of FIG. 6 with either a known active GBIC adapted for copper media or a known active GBIC adapted for fiber optic media. The embodiment of FIG. 6 will work in such situations so long as certain adjustments are made. GBICs are media interface devices that accept digital data and drive it onto a particular media type and which can be plugged into or unplugged from sockets on the circuit boards of the hub or node in which the subchannel transmitter resides. With either active copper GBICs or active fiber GBICs, a digital buffer is in the GBIC circuit which will eliminate any amplitude variation of the combined signal launched into the shared media from the GBIC leaving only the pulse width modulation of the NRZ combined signal to carry the subchannel information. In such a case, the injection amplitude of the subcarrier on line 56 must be adjusted to inject a little more power. The amount of power injected must be enough to force the amplitude of the subchannel components in spectrum 80 to be high enough to be detected over the noise at input 54 in the frequency range of the subcarrier but not so high as to cause excessive jitter.

To aid in the reception process, the upper corner of the low pass filter 74 is set so as to exclude as much low frequency energy as possible from the high speed NRZ data spectrum in the vicinity of the subcarrier frequency while passing the subcarrier spectral components. The low pass filter is designed to have a high input impedance so as to not load down the high speed signal and distort it at the input to the high speed data receiver. For ci subcarrier having a frequency of 1 mHz, the upper 3 dB corner of the low pass filter transfer function is set at approximately 3 mHz. Note that no high pass or bandpass filter is put between the shared media 20 and the high speed data receiver 84. This is done so as to not remove any low frequency components of the combined signal from the input to the high speed data receiver since removal of these low frequency components distorts the high speed data waveform, and the subchannel spectral components are not powerful enough to impede normal reception in high speed receiver 84 of the high speed data waveform.

The low pass filter output 54 is coupled to the subchannel receiver which amplifies the subchannel signal and demodulates the subchannel data therefrom.

This subclass of species represented by FIG. 6 where amplitude variations in the combined signal are passed to the subchannel receiver 50 is much less susceptible to noise interfering with reception of the subchannel signal because the voltage of the subchannel Fourier components are much higher than in the species wherein digital buffers are present to eliminate the amplitude variations and leave only pulse width modulation of the high speed data to carry the subchannel information. This species is not dependent upon a bounded transition density because the amplitude variations in the combined signal reach the linear subchannel receiver.

Figure 10:
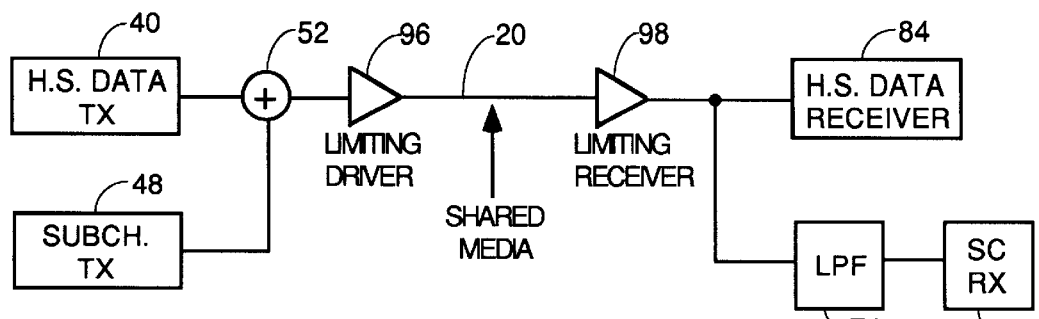
FIG. 10 represents the species within the backward compatible genus where digital buffers in media interface transceivers exist for the copper media case.
Figure 11:
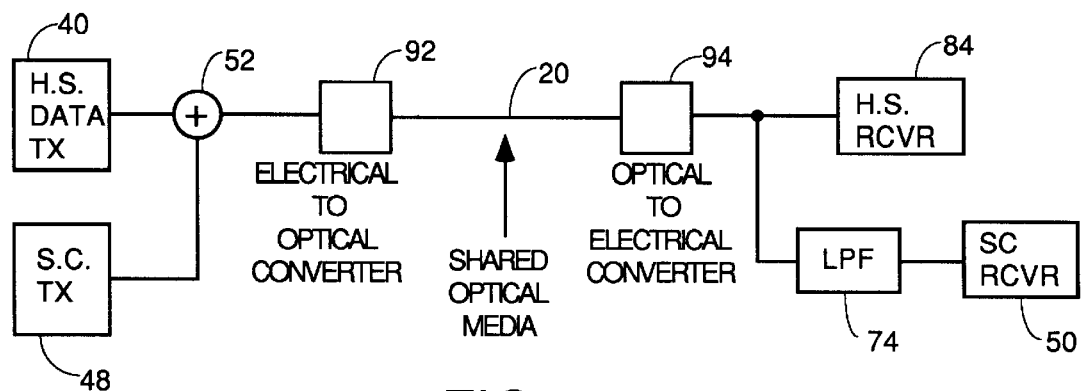
FIG. 11 is the same as FIG. 10 for the fiber optic media case.

The species within the backward compatible genus where digital buffers in media interface transceivers exist are represented by FIG. 10 for the copper media case and FIG. 11 for the fiber optic media case. Most transceivers for fiber optic media include digital buffers. These two species represent subclasses which include the active copper GBIC and active fiber GBIC species mentioned above as well as other species which are "hardwired" for only copper or only fiber, i.e., where GBIC technology is not used. An example of a non GBIC species is where the electrical to optical converter media interface circuits 92 and 94 are fixed optical transceiver modules. An example of a non GBIC species where the shared media is copper is where fixed copper-media DB-9 connectors are used with digital output and input buffers. In all these species where active media interfaces with digital buffers exist between the summing junction 52 and the input to the subchannel receiver 50, the amplitude of the subchannel carrier signal injected into summing junction 52 will have to be adjusted to get sufficient subchannel signal at the subchannel receiver 50 to be detected over the noise but not so much amplitude as to cause excessive jitter in the high speed data receiver 84. A typical target for what is too much jitter is substantially more than 15 picoseconds although, for example, 25 picoseconds jitter may not cause unacceptably high bit error rates in the high speed data recovery process. The criteria for too much jitter really depends upon how much jitter causes either loss of synchronization or unacceptably high bit error rates in the high speed data recovery process.

Note that since no changes or additions need to be made to the standard high speed transmitter 40 or the high speed data receiver 84 or to the media interface circuits 92, 94, 96 or 98 in order to carry out the subchannel transmission and since these high speed data link components still work the way they always worked in the prior art and are unaffected by the presence of the subchannel signal, all the species represented by FIGS. 6, 10 and 11 and the specific FSK/PWM based embodiments to be described below all fall within the first backward compatible genus. Subchannel data in all these species can be recovered by the same type subchannel receiver 50 and low pass filter 74 as discussed above for the FIG. 6 embodiment. The only real difference between the subclasses of preferred embodiments represented by FIGS. 10 and 11 and the subclass of embodiments represented by FIG. 6 are that the combined signal input to the low pass filter 74 in the embodiments of FIGS. 10 and 11 carries the subchannel information solely in the form of PWM of the high speed data signal. The subchannel frequency spectrum is still present in the spectrum of the combined signal but at a much lower amplitude, i.e., at an amplitude represented generally by dashed line 100 in FIG. 2. As noted above, this substantially reduced amplitude is proportional to the amount of pulse width modulation (a function of the amplitude of the injected subchannel carrier) and to the transition density of the high speed data and is about 32 dB down from the full power level of the high speed data assuming 8b/10b encoding with an average transition density of 0.6. The dynamic range requirement on the subchannel receiver 50 depends upon whether it is to be used in a species within the subclass of FIG. 6 in addition to being used in species within the subclasses represented by FIGS. 10 and 11. If only species within subclasses of FIGS. 10 and 11 are to be used, the dynamic range requirement of receiver 50 can be much less, and it can be designed specifically to be narrow band and able to detect signals that are 32 dB down from the high speed data amplitude levels.

Figure 12:
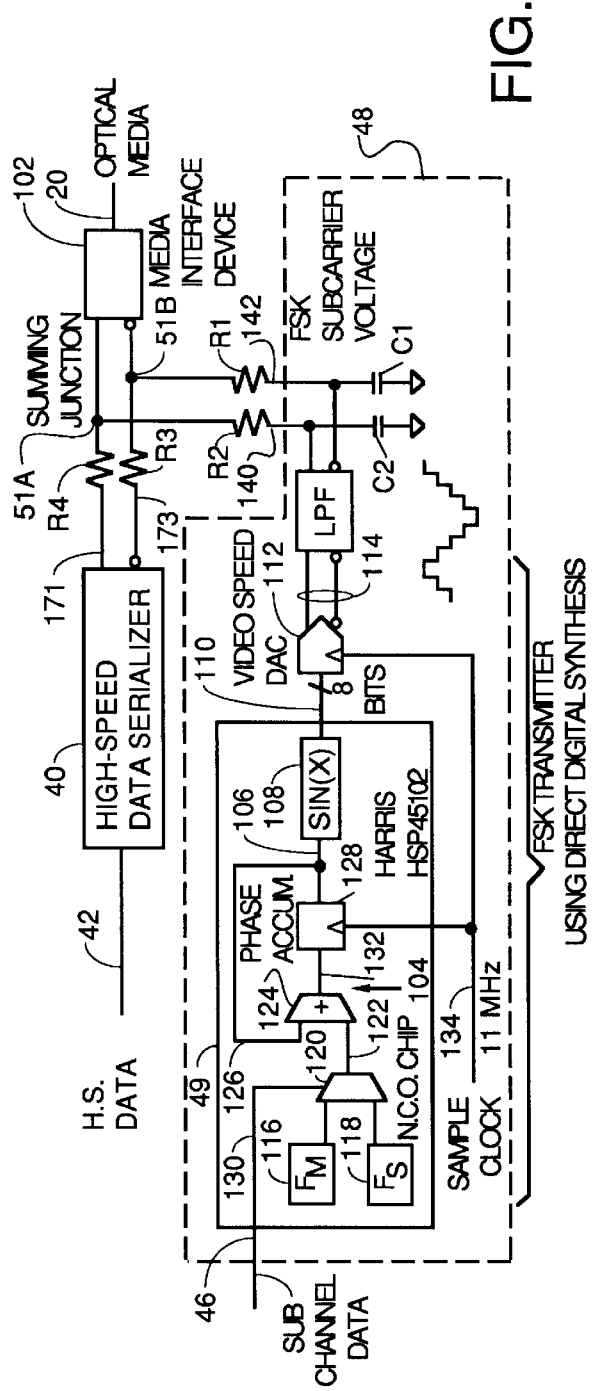
FIG. 12 shows a specific embodiment of a species of subchannel transmitter within the backward compatible genus in the form of an FSK transmitter using direct digital synthesis.

Referring to FIG. 12, there is shown a specific embodiment of a species of subchannel transmitter within the backward compatible genus in the form of an FSK transmitter using direct digital synthesis. Of course, the species of FIG. 12 falls within the subclass represented by FIG. 6 if the media interface device does not have any digital buffer therein and there are no digital buffers downstream in front of the input of the subchannel receiver. In this case, the a numerically controlled, digital synthesis FSK modulated carrier generation chip 49 is used to generate FSK modulated subchannel carrier digital samples. This chip is available from Harris Semiconductor as the HSP45102. This chip uses a phase accumulator to generate a sawtooth pattern of phase numbers on line 106 which are used to address a sin(x) lookup table in ROM 108. The result is a stream of 8 bit digital numbers representing amplitude levels on a sin(x) waveform having the frequency of the subchannel carrier on line 110. The center frequency selected for the subchannel carrier can be varied, but higher frequencies have more jamming problems from spectral components in the high speed data, and very low frequencies do not propagate well through the media. The subchannel carrier frequency has been tried as low as 500 kHz, but this frequency did not work well in some cases because of noise in this frequency range caused by certain media receivers.

The numbers output from the ROM 108 are converted to an analog signal by a video speed digital-to-analog converter 112 with differential outputs 114. Frequency shift keying is accomplished using two registers each of which stores a different phase incrementation constant. Register 116 stores the mark phase incrementation number and register 118 stores the space phase incrementation number. These two registers have their outputs coupled to two different inputs of a multiplexer 120 which has its output coupled to one input of an accumulator 124. The other input 126 of the accumulator is coupled to the output of a register 128 which stores the current phase value. The switch control input 130 of the multiplexer 120 is coupled to a source of the subchannel data such that the logic state of the subchannel data controls whether the mark value or space value is added to the value on line 126 during any particular clock cycle. The register 128 loads the sum generated by the accumulator on line 132 on each new cycle of a 11 mHz clock on line 134. The values of the mark and space constants are set such that the resulting frequency output by the DAC 112 is a subchannel carrier having a center frequency of approximately 1.152 mHz which shifts plus 29 kHz for a logic 1 on line 46 and minus 29 kHz for a logic 0 on line 46.

The circuit of FIG. 12 represents one type of injection network used to add the subcarrier to the high speed data for the case of an optical media driven by a GBIC optical media transceiver 102. In other species with different media and media interface types, the specifics of the injection network impedances, and whether or not differential injection is used are different. The differences principally depend upon the type of media in use and the type of media interface circuit that is in use. The reason for these variations is that copper media has different loss characteristics for the high speed data than fiber media, and different media interface circuits have different noise generation properties and some remove the amplitude variations and some do not.

Thus, to get an adequate amount of amplitude in the subchannel components at the receiver so as to be detectable with an acceptable bit error rate without causing excessive jitter in the high speed data receiver requires adjustments in the amplitude and frequency of the injected signal at the transmit side. These adjustments depend upon the factors defined above. For example, it was discovered when the fixed optical 1×9 transceiver module was first used to interface the transmitter to a fiber optic media with a subcarrier frequency of 500 kHz that the system did not work. This was because of noise generated by the optical transceiver in the 750 kHz range. The solution to this problem that enabled successful subchannel transmission on fiber optic media for the first time was to raise the subchannel frequency to 1.152 mHz and filter the power supply voltage better to cut down the amount of noise generated by the optical transceiver. Certain types of optical transceivers such as the fixed optical 1×9 media driver first tested in May of 1997 with a subchannel carrier of 0.5 mHz were discovered to be very sensitive to power supply noise, and the system did not work. By July of 1997, it was discovered that moving the subchannel carrier frequency to about 1 mHz and filtering the power supply better gave adequate noise margins for successful transmission of subchannel data.

Another example of the type of adjustments that need to be made on the transmitter side to enable successful transmission of subchannel data arises from the differences in propagation of the high speed data on copper versus fiber. Copper media has skin effect andi leakage losses that increase with increasing frequency as is well known to those familiar with the transmission line art. Fiber optic media has neither of these two phenomenon. TIRe gigabit high speed data has many very high frequency components in its Fourier spectrum. These high frequency components suffer more losses than the much lower frequency components of the subchannel data as the two sets of Fourier components propagate down a long copper shared media 20. As a result of the losses that occur in copper media, consider the following. Assume that at the beginning of a 30 meter copper media, there is launched a high speed data signal with transitions with a 150 picosecond rise time with a subcarrier injection amplitude equal to about 1/10 the peak-to-peak amplitude swings of the high speed data NRZ waveform. This level of injection would cause a jitter of about 15 picoseconds if the high speed receiver were very close to the launch point. However, the losses in the 30 meter span of copper media will cause a loss of peak-to-peak amplitude of the high speed data NRZ signal and will flatten out the leading and trailing edge transitions to increase the rise and fall times to, for example, 300 picoseconds. However, the low frequency components of the subchannel do not suffer losses nearly as great over the 30 meter span. As a result, the subchannel signal at the high speed receiver end will still have an amplitude which is 1/10 the peak-to-peak amplitude of the high speed data as it existed at the transmitter end. The addition at the receiver end of the subchannel signal and the high speed data will cause substantially more jitter because of the flatter rise and falltimes arid lower peak-to-peak amplitudes in the high speed data at the receiver end. As much as 50 picoseconds of jitter might be experienced by the high speed receiver in this situation, and this is an excessive amount in that it is more than the subchannel receiver needs to detect the subchannel signal and it can cause bit errors in the high speed data stream. Thus, an important adjustment for the long copper media case is to reduce the amplitude of the injected subchannel signal to reduce the amount of jitter caused at the high speed data receiver. Also, in systems using GBIC technology for field replacement and switchover between copper and fiber optic media, the subchannel transmitter includes a variable attenuator which has at least two different attenuation settings. One of these attenuation settings is used for copper media and the other for fiber media.

In the subchannel transmitter system shown in FIG. 12 the amplitude of the injected subchannel signal is controlled by the ratio between the resistors R1 and R3 and the ratio between resistors R2 and R4. The specific impedance values are selected for optical media 20 and a GBIC optical transceiver 102 which has a digital buffer and is internally terminated on both lines with 75 ohm resistors. R1 and R2 are approximately 2000 ohms each, and R3 and R4 are approximately 47 ohms each. The peak-to-peak voltage swing on each of lines 140 and 142 is approximately 4.5 volts. Capacitors C1 and C2 shunt high frequency components from the high speed data signal to ground to help keep them out of the output of the DAC. Typically these capacitors are on the order of 47 picofarads, and are used in all the injections schemes. AC coupling capacitors in series in both the subchannel and high speed data lines and biasing resistors coupled to. lines 171 and 173 to supply bias voltage for the output stage of the high speed data transmitter 40 are not shown. Nodes 51A and 51B comprise the summing junction.

Figure 13:
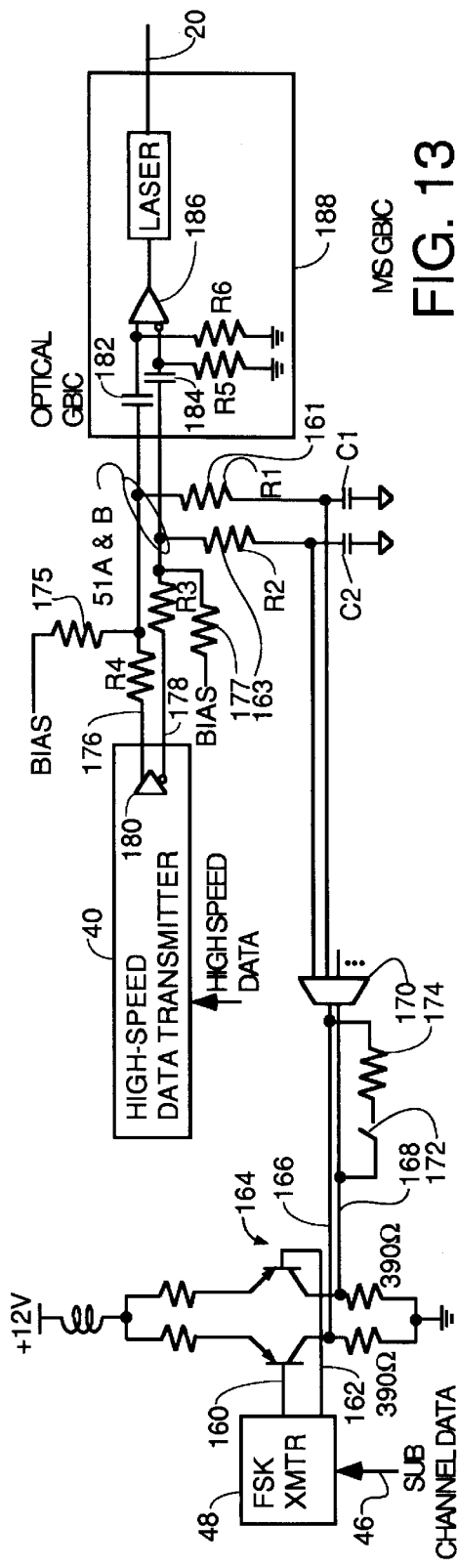
FIG. 13 shows an embodiment of a subchannel injection mechanism with a variable attenuator for use with GBIC media interfaces and including a variable attenuator so that the same subchannel transmitter may be used with either copper or fiber optic media without causing excessive jitter simply by changing a switch position.

FIG. 13 shows an embodiment of a subchannel injection mechanism with a variable attenuator for use with GBIC media interfaces and including a variable attenuator so that the same subchannel transmitter may be used with either copper or fiber optic media without causing excessive jitter simply by changing a switch position. GBIC media drivers exist for both copper and fiber optic media so that the subchannel transmitter species shown in FIG. 13 can be used with either fiber or copper media. With GBIC media driver technology, the replacement of the media does not require return of the unit to the manufacturer for modification—the technician merely needs to plug in a GBIC driver adapted for the new media and set switch 172 appropriately. The design of the subchannel transmitter of FIG. 13 is adapted such that the amplitude of the injected subcarrier signal can be easily adjusted for either copper or fiber media to prevent excessive jitter in the high speed data receiver through appropriate manipulation of switch 172. Subchannel data arrives on line 46 at the input of FSK subchannel transmitter 48 which uses the data to generated a frequency shift keyed subcarrier at a frequency of 1.152 mHz center frequency. Differential outputs of the FSK transmitter on lines 160 and 162 are applied to a differential, emitter-coupled, analog voltage amplifier 164 with an output impedance of 390 ohms. The only reason this amplifier 164 is present is to boost the peak-to-peak amplitude swings on each of the differential output lines to 4.5 volts from the 2 volt peak-to-peak swing that is output on lines 160 and 162 from the FSK transmitter so as to obviate the need to redesign the FSK transmitter while still getting the necessary drive amplitude. In other embodiments where an FSK transmitter with at least a 4.5 swing on each differential output is used, amplifier 164 can be eliminated. Differential outputs from the emitter follower on lines 166 and 168 are coupled to differential inputs of a port selection switch 170. This switch 170 is present because the subchannel transmitter is usually implemented in a high speed data hub with many ports coupled to drop lines which are connected to various pieces of equipment in the network. The management and control process 16 in FIG. 1 needs to be able to communicate bidirectionally with each of the nodes on the network to manage the network. Since management and control data does not have to be sent to or gathered from all nodes simultaneously, it is less expensive to include only one subchannel transmitter in the hub and have the management and control process control switch 170 in accordance with which piece of equipment to which a management and control packet is to be transmitted.

Variable attenuation is achieved through use of switch 172 and a 390 ohm resistor 174 which matches the 390 ohm output impedance of the analog amplifier . The series combination of switch 172 and resistor 174 are coupled across lines 166 and 168. The peak-to-peak amplitude swing of the subcarrier signal for each of the differential outputs of the emitter follower 164 is about 4.5 volts, and when switch 172, this voltage amplitude is unaffected and is passed through the port selection switch 170 to the summing junction 51. The ratio of resistor R1 to R4 and the ratio of resistor R2 to R3 establish the amount of injected subcarrier power into summing node 51. Resistors R3 and R4 in FIG. 13 are approximately 47 ohms each and function to reduce excessive voltage swing. Resistors R1 and R2 in FIG. 13 are approximately 2K each. External bias voltage is applied to the output terminals of the output stage of the high speed data transmitter through 100 ohm resistors 175 and 177. Shunt capacitors C1 and C2 having values of approximately 150 picofarads each shunt high speed data signals to ground thereby preventing upstream propagation of these signals into the output of the FSK transmitter. Biasing resistors coupled to lines 176 and 178 to supply bias voltage to high speed transmitter output stage 180 are not shown. The summing junction nodes 51A and 51B are coupled through 0.01 microfarad AC coupling capacitors 182 and 184 to differential inputs of a digital buffer 186 in GBIC transceiver 188. The two lines 176 and 178 carrying the combined one gigabit NRZ signal are terminated inside the GBIC driver by 75 ohm resistors R5 and R6 to prevent reflections.

When the GBIC 188 is of the type for coupling to fiber optic media, switch 172 is left open. When the GBIC 188 is of the type for coupling to copper media, switch 172 is closed, and this causes the peak-to-peak voltage swing on lines 166 and 168 to be reduced to levels suitable to cause the right amount of injected subcarrier power to create a detectable subchannel signal at the subchannel receiver but not cause excessive jitter at the high speed data receiver. The copper media GBIC is a passive device which simply includes an AC coupling capacitor in each differential line and no digital buffer. When the passive copper GBIC is used, the combined signal injected into the media is the summed signal shown in FIG. 7 and not the pure PWM signal shown in FIG. 8 because of the absence of a digital buffer in the passive copper GBIC. Because the presence of subchannel injection levels appropriate for an active optical media GBIC would cause excessive jitter in the high speed data receiver, the two position attenuator comprised of switch 172 and resistor 174 are used to reduce the amplitude of the injected subchannel signal when a passive copper GBIC is in use.

The special differential feed design for the subchannel species shown in FIG. 13 is made necessary by the fact that the GBIC 188 includes internal termination resistors R5 and R6. These internal termination resistors in parallel with the output impedance of the high speed data transmitter cause the summing junction nodes 51A and 51B to have a low impedance even at the frequency of the subchannel carrier. This means that much more subchannel injection current must be supplied to the summing junction to get adequate subchannel voltage at the summing junction (approximately 30 millivolts peak-to-peak is needed there). This higher injection current is achieved by: (1) increasing the peak-to-peak amplitude of the subchannel carrier signal on each differential line 166 and 168 to 4.5 volts peak-to-peak; (2) reducing the values of the injection resistors 161 and 163 to 2K; and (3) injecting both sides of the differential high speed data line. The last feature necessitates the use of differential circuitry for the subchannel system.

Referring to FIG. 14, there is shown a species in the backward compatible genus of a subchannel transmitter injection network for use with fiber optic media and a fixed optical 1×9 media transceiver. In this species, the FSK subchannel transmitter 48 generates a single ended subcarrier signal having a 2 volt peak to peak amplitude on line 190. This signal is injected into summing junction 51 through a 6.8 Kohm resistor 192.

Capacitor C1 having a value of approximately 47 picofarads shunts any high speed data signals to ground to keep them from entering the output of the FSK subchannel transmitter. The high speed data signal on lines 194 and 196 is coupled through AC coupling capacitors to differential inputs of a fixed optical 1×9 media transceiver 202 which includes a digital buffer 204. The high speed signal lines 194 and 196 are coupled to a bias voltage source via 47 ohm resistors 198 and 200 which also serve to help terminate the high speed data lines 194 and 196 in their characteristic impedance. High speed data lines 194 and 196 also include series 47 ohmresistors 199 and 201 and series AC coupling capacitors 203 and 205. Capacitor 205 has capacitance of 150 picofarads. Capacitor 203 has capacitance of 0.01 microfarads. The fixed optical 1×9 media driver 202 is not internally biased so bias voltage is supplied to the inputs of the digital buffer 204 through 1.6 K resistors 206 and 208. Note that the subchannel carrier injection is downstream of the high speed data signal output and upstream of the media driver, so again, the only way the subchannel signal gets expressed in the combined high speed NRZ signal on shared media 20 is through pulse width modulation or perturbation of the reference voltage crossing times of the NRZ transitions. The function and design considerations for capacitors 203, 205 and 193 and resistor 192 are the same as for corresponding capacitors 228, 230, 218 and resistor 216 in the copper media case shown in FIG. 15. These components function basically to block the subchannel signal from propagating upstream into the high speed data output and to make the summing node 51 have a high input impedance at the subchannel carrier frequency so that a high value resistor can be used to inject the subchannel signal. This high value resistor plus the shunt capacitor 193 to ground (which has a low impedance at the high speed data frequency) helps prevent the high speed data signal from propagating into the output of the subchannel transmitter.

FIG. 15 shows a subchannel transmitter injection network for use with copper media and a fixed midia driver integrated circuit. A numerically controlled oscillator 49 generates a stream of digital data on bus 210 that represent digital "samples" (they are generated by a table lookup) of an FSK modulated sine wave of approximately 1 mHz center frequency. Video speed digital to analog converter 212 converts the data on bus 210 to an analog FSK modulated subcarrier of approximately 2 volts peak-to-peak amplitude and 1 mHz center frequency on line . Resistor R7 and capacitor C3 act as a low pass filter to shunt high speed data components to ground and to smooth out the DAC output signal. The low pass filters in all the subchannel transmitters of the preferred species prevent the edges of the high speed data from jumping drastically from one reference voltage crossing time to another so that the transitions are made smoothly. This aids the high speed receiver in maintaining synchronization lock. However, if high speed receivers are in use which will not lose lock when the edges jump, the low pass filters at the output of the DACs can be eliminated. This signal is coupled through AC coupling capacitor C4 to the input of a port selection switch 170 where it is switched onto whatever port output line is selected by the subchannel management and control process. The subchannel carrier signal is coupled to summing junction 51 through an 1.6 Kohm (hereafter just K) resistor 216, and high speed data components are shunted to ground through 47 picofarad capacitor 218. The high speed data signals on lines 220 and 222 are coupled through AC coupling capacitors 228 and 230 to the inputs of Vitesse 7120 fixed copper media interface driver 232. Capacitor 230 has a capacitance of 150 picofarads and capacitor 228 has a capacitance of 0.001 microfarads. The relatively low value of capacitor 230 which, because of the frequency of the subchannel signal, isolates the summing node from the low output impedance of the gigabit data signal source. This causes the summing node 51 to have a relative high impedance at the subchannel frequency so that the injection can be done with a relatively high value resistor which helps suppress transmission of the gigabit data signal into the output of the subchannel amplifier. The 47 pf capacitor 218 also helps shunt the high speed data signal to ground to help prevent its propagation upstream into the subchannel transmitter output.

The media interface driver includes two internal digital buffers and 6.8 K biasing resistors. The differential outputs of the output digital buffer in fixed media interface 232 are each coupled to ground through a voltage divider. Output line 233 is coupled to ground through 47 ohmresistor 226 and 100 ohm resistor 227. Output line 235 is coupled to ground through 47 ohmresistor 224 and 100 ohm resistor 225. These two voltage dividers define two output nodes 237 and 239 where the voltage swing on each of output lines 233 and 235 are divided down to lesser values. Output node 239 is coupled to a DB-9 connector terminal through AC coupling capacitor 241 having a value of 0.01 microfarads. Output node 237 is coupled to another terminal of the DB-9 via capacitor 243 also having a capacitance of 0.01 microfarads. The DB-9 can be connected to copper media or an external optical adapter. Two 75 ohm resistors 234 and 236 coupled to lines 220 and 222 supply bias voltage to the outputs of a differential amplifier output stage integrated circuit in high speed data transmitter 40 and terminate the high speed data lines in their characteristic impedance. In this embodiment, the subchannel signal is injected at the serial input of the media interface driver 232 such that the summing node 51 is isolated from the copper media 20 by the digital buffers inside the media interface driver 232 thereby causing the subchannel signal to be expressed on the media solely in the form of a pulse width modulated NRZ high speed data signal.

Figure 16:
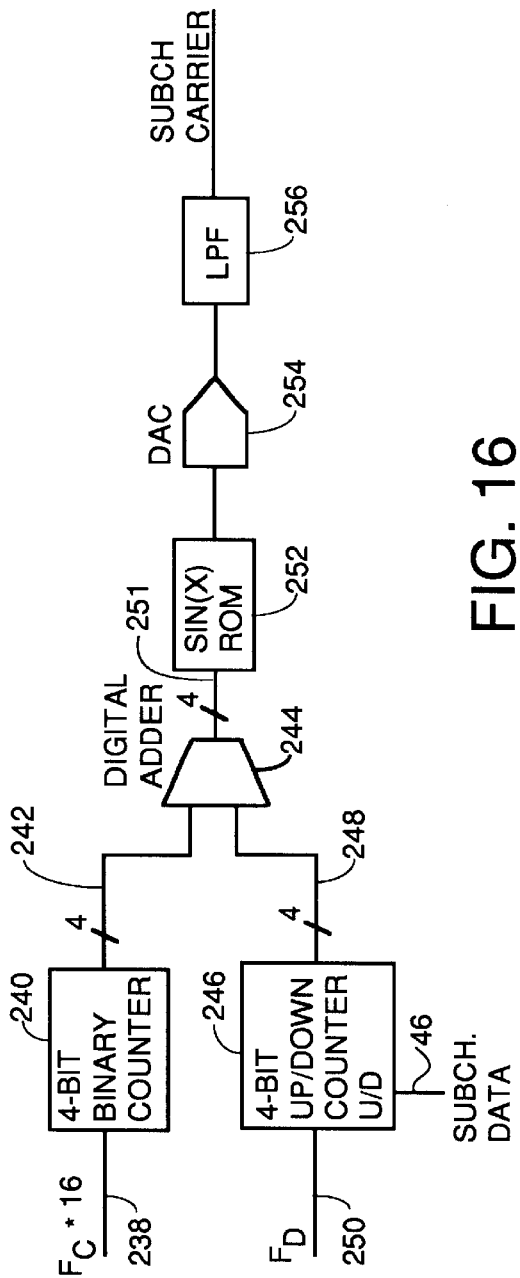
FIG. 16 is a diagram of a less expensive frequency shifted keyed subcarrier transmitter.

FIG. 16 is a diagram of a less expensive frequency shifted keyed subcarrier transmitter. A four bit binary counter counts clock pulses of a clock signal on line 238 and outputs the count on bus 242 which is coupled to one input of a digital adder 244. The clock signal on bus 238 is 16 times the frequency of a desired center frequency $F_c$ for the subchannel carrier. A four bit up/down counter has its output coupled via bus 248 to the other input of digital adder 244. The count input of the up/down counter is coupled to a clock via line 250 which has a frequency which is equal to the 16 times the amount of deviation in frequency desired for the mark and space frequencies from the center frequency of the subchannel. The up/down control input of the up/down counter is coupled to receive the subchannel data via line 46. The output of the digital adder 244 is a stream of phase numbers which are coupled to the address input of a sin(x) ROM 252 that stores the corresponding amplitude values of a sine wave for each phase value in a storage location corresponding to each phase value. The output amplitude numbers from the ROM are input to video speed DAC 254 for conversion to an analog signal which is smoothed out by low pass filter 256. Typical clock rates are $F_c$=120 times the bit rate of the subchannel data, $F_b$, and $F_d$=3 times $F_b$. A typical value for $F_b$ is 9.6 kHz. The deviation $F_d$ is actually more than is needed for this bit rate $F_b$, so higher bit rates for the subchannel data can be supported. Conversely, a smaller deviation may be selected, and this improves the signal-to-noise ratio in the receiver because a narrower bandpass filter bandwidth may be selected. With the current deviation, the mark and space frequencies are about 60 kHz apart and this requires a bandpass filter in the receiver with a bandwidth which is large enough to pass both frequencies. With currently available filter chips, a 100 mHz bandwidth filter is the closest choice available, and this causes excess noise to be let into the frequency demodulation part of the receiver. If a custom bandpass filter is built, a smaller bandwidth can be designed in, and this problem is mitigated. However, it is cheaper and easier to buy a filter chip, and since the deviation is more than is needed for detectability, a smaller deviation can be chosen to give adequate detectability while allowing a bandpass filter which is commercially available with a smaller bandwidth to be selected.

In operation, the transmitter of FIG. 16 generates 16 amplitude values at the input of DAC 254 for every 16 ticks of the clock on line 238 absent the effect of the subchannel data. When the subchannel data is a logic 1, the up/down counter counts up at the rate of $F_d$, and these numbers are added to the numbers on line 242 thereby causing digital adder 244 to reach the maximum number that can be expressed in 4 bits sooner and roll over to 0000. The roll over to 0000 marks the end of one cycle. This shortens the period thereby raising the frequency $F_c$ by the value $F_d$, i.e., the mark frequency. When the subchannel data is logic 0, the up/down counter counts down from zero at the rate of $F_d$ and these negative numbers, when added to the numbers on bus 242 cause the digital adder to reach it maximum and roll over to 0000 slower than otherwise would be the case if the up/down counter was inoperative. This lowers the frequency of the sine wave generated by the DAC to the space frequency.

It is possible to further simplify the transmitter of FIG. 16 by eliminating the DAC and sin(x) ROM and use only the low pass filter 256 fed by the most significant bit on bus 251. If the up/down counter 246 is not operating, the MSB will be at logic 1 for 8 ticks of the clock on line 238 and logic zero for the next 8 ticks thereby establishing a square wave at the frequency $F_c$. If the subchannel data is logic 1 and the up/down counter is working, the MSB will be advanced in phase by one tick of the clock on line 238 every 40 ticks thereof. In other words, the mark frequency will be generated as $F_m=41/40*F_c$. Likewise, if the subchannel data is logic 0, the MSB will be retarded in phase by one ticlk of the clock on line 238 every 40 ticks thereof to generate a square wave having the space frequency of $F_s=39/40*F_c$. The problem with this square wave subchannel carrier frequency generation process is that the Fourier spectrum of a normal square wave with a regular period contains only odd harmonics of the fundamental $F_c$, while the perturbed period square waves at the mark and space frequencies all have spurious frequency components which are an additional source of noise to the subchannel receiver.

Figure 17:
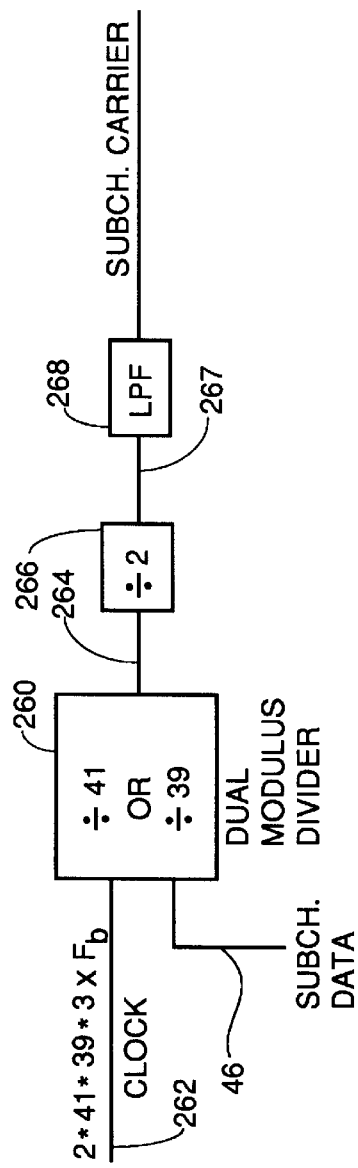
FIG. 17 is a block diagram of a simple subchannel FSK transmitter using a dual modulus divider.

An even simpler form of FSK subchannel transmitter is shown in FIG. 17. In this embodiment, a dual modulus divider circuit 260 is used to divide the clock signal on line 262 by a divisor of either 41 or 39 depending upon whether the subchannel data on line 46 is a logic 1 or logic 0 and a mark or space frequency is to be generated. The clock signal or line 262 has a frequency which is twice the lowest common multiple of the deviation frequency $F_d$. The clock frequency on line 262 is $2*41*39*F_d$. The output of the dual modulus divider on bus 264 is divided by 2 by circuit 266 and the resulting square wave represented by the MSB on line 267 is filtered by a low pass filter 268. The advantage of the embodiment of FIG. 17 is that it does not generate any spurious noise. The embodiment of FIG. 17 may be further simplified by eliminating the divide by two circuit 266 and reducing the frequency of the clock on line 262 to $41*39*F_d$.

Figure 18:
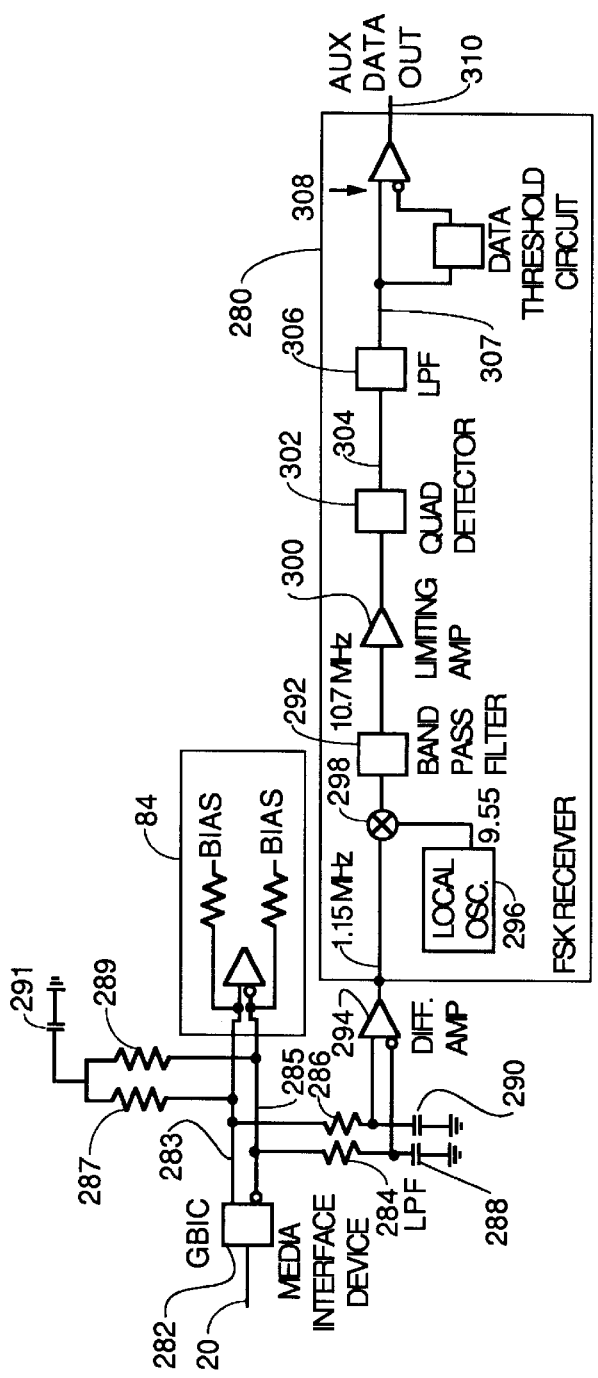
FIG. 18 is a block diagram of the preferred subchannel FSK receiver.

Referring to FIG. 18, there is shown a block diagram of the subchannel receiver. The FSK discriminating subchannel receiver 280 shown in FIG. 18 can take its input directly from the shared media 20 if it is copper or from the output of an optical-to-electrical converter 282 as shown. In the preferred species, subchannel receiver 280 is a commercially available MC3356 chip from Motorola. A low pass filter comprised of resistors 284 and 286 and capacitors 288 and 290 functions to block the powerful high frequency components in the high speed data spectrum from overwhelming a bandpass filter 292 within the receiver. This low pass filter is important to successful reception since the subchannel signal in the preferred species which rely solely on pulse width modulation to get the subcarrier information through digital buffers on the link is very weak. Typically, depending upon transition density, it is 32 dB down from the amplitude of the high speed data signals. It is however strong at its frequency relative to the low frequency component of the high speed data spectrum in the vicinity of the subchannel carrier. Rolloff of the low pass filter is set to be approximately 3 mHz. The high input impedance of the low pass filter at the gigabit data frequency also prevents the gigabit signal from being loaded down by the presence of the low pass filter. The gigabit data lines are coupled directly to the inputs of the high speed data receiver without any filtering.

The high speed data signal is AC coupled onto lines 283 and 285 by GBIC media interface 282 through internal AC coupling capacitors. Lines 283 and 285 are terminated by two 75 ohm resistors 287 and 289 at the input to the high speed data receiver 84. A capacitor 291 from the center tap of the two resistors 287 and 285 functions to help provide common mode termination.

A differential amplifier 294 provides amplification of the subchannel signal and rejection of common mode noise in addition to differential-to-single-ended conversion. In the preferred embodiment, a port select switch (not shown) having one of a plurality of inputs coupled to the output of said amplifier 294 and having an output coupled to the input of the FSK receiver 280 is used so that the FSK receiver can be shared between multiple ports in a hub. Each input of the port select switch would be connected to receive the combined signal from one of the ports of the hub, and the management and control process would control switching by said port select switch.

A local oscillator 296 and mixer 298 combine to shift the frequency of the subchannel carrier up to an IF frequency of 10.7 mHz. The local oscillator 296 generates a local oscillator signal of 9.55 mHz at one input of mixer 298. The mixer generates sum and difference frequencies at 10.7 and 8.4 mHz. The sum frequency is selected as the IF frequency because components are more readily available. The local oscillator can be a phase lock loop (external to the chip) or a crystal can be connected to appropriate inputs of the chip to set the local oscillator frequency.

The mixer output is passed through ceramic bandpass filter 292 which has a center frequency at 10.7 mHz and a 100 kHz bandwidth. This is the lowest bandwidth that is available for this frequency range and is larger than is necessary for the 60 kHz spread between the mark and space frequencies so a custom narrower bandwidth bandpass filter would be more desirable.

The output of the bandpass filter is applied to the input of a limiting amplifier 300. The function of the limiting amplifier is to tame the large voltage variations that can result at the output of the bandpass filter such that the output of the limiting amplifier is approximately the same voltage all the time despite the fact that the input voltage can vary by a factor of 100.

Figure 19:
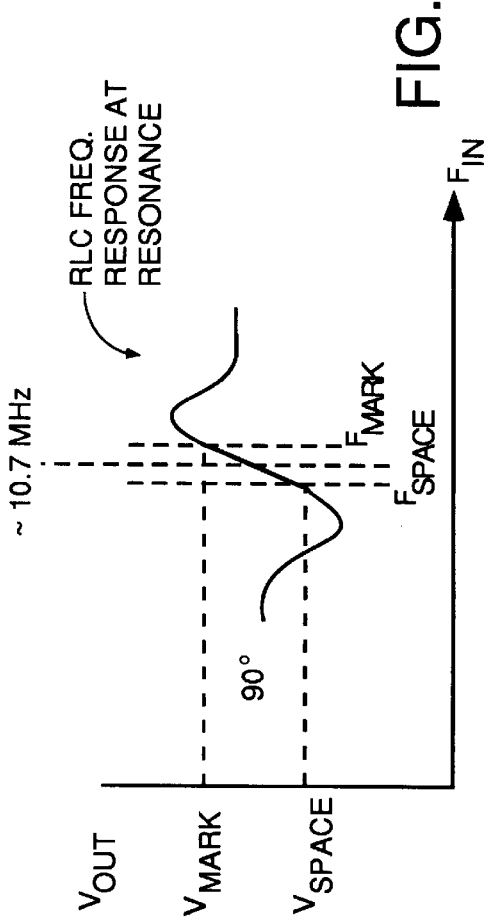
FIG. 19 is a diagram of the frequency response of the RLC circuit at resonance in the quad detector of the FSK receiver.

The output of the limiting amplifier is coupled to the input of a quadrature detectcr 302 which functions to convert the FSK frequency shifts between mark and space frequencies to voltage variations on line 304. The resulting signal on line 304 is a baseband data waveform plus a component at twice the IF frequency and a DC offset sensitive to quad-coil tuning and drift over time. As is known to those skilled in the art, the quadrature detector uses a tuned circuit comprised of an inductor, capacitor and resistor in parallel which couples one input of a mixer in the quadrature detector to ground. This RLC circuit has a frequency response at resonance like that shown in FIG. 19. The result is that when a mark frequency enters the detector a first output voltage is generated on line 304, and when a space frequency enters, a different output voltage is generated on line 304.

The baseband signal on line 304 is passed through a low pass filter to smooth it and to block the component at twice the IF frequency, and is then coupled to the input of a data threshold circuit 308. The function of the data threshold circuit 308 is to regenerate the original subchannel digital data signal that entered the transmitter on line 46 by converting the voltage changes on line 307 to logic 1 and 0 levels on line 310. Quad coil drift may cause a varying DC offset to be present in the signal on line 307 that needs to be taken into account when discriminating between logic 1 and logic 0 voltage levels on line 307. This DC offset is eliminated by using an adaptive threshold reference voltage for a comparator which is used to discriminate between the mark and space voltages. The subchannel data is not CID balanced, so the average voltage of line 307 cannot be used as the discrimination threshold. The data threshold circuit is comprised of a comparator with its reference voltage input coupled to the output node of a peak detector. The reference voltage output by the peak detector is the peak voltage, corresponding to logic 1, minus a constant equal to half the normal voltage swing on line 307. The sets the reference voltage approximately halfway between the mark and space voltages.

Figure 20:
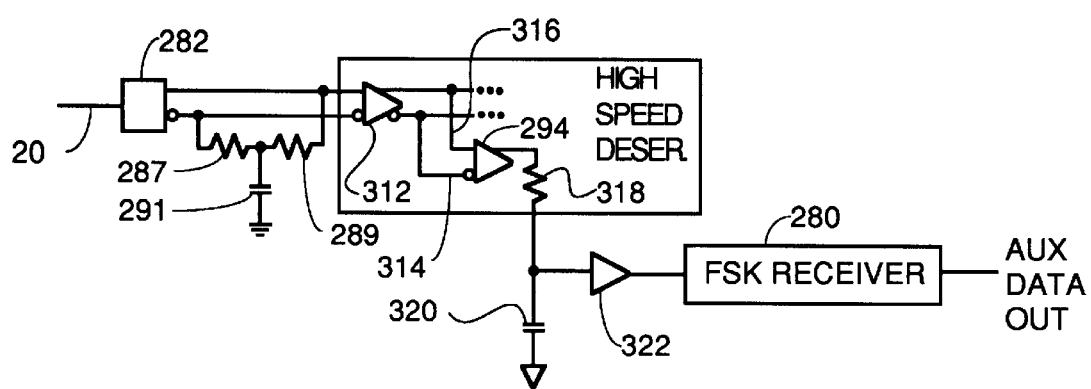
FIG. 20 is an alternative embodiment of a subchannel receiver which is useful in a proprietary link where access to the internal circuitry of the high speed data receiver is possible.

Referring to FIG. 20 there is shown an alternative embodiment of a subchannel receiver which is useful in a proprietary link where access to the internal circuitry of the And high speed data receiver is possible. In this embodiment, the subchannel tap is taken after the digitally buffered input stage 312 of the high speed data receiver. A pair of lines 314 and 316 carry the combined differential signal to differential amplifier 294 for common mode rejection and conversion to singled ended operation. The output of amplifier 294 is passed through an RC low pass filter comprised of resistor and capacitor 320. Amplifier 322 couples the filtered signal to the input of the FSK receiver 280. The advantage of this embodiment is that the gigabit data path is not connected to any subchannel circuitry so no parasitics from subchannel circuitry can load down or distort the high speed data. Further, the function of common mode rejection and conversion to single-ended operation is now done on the high speed receiver chip and does not have to be performed by external components thereby reducing the cost of the receiver.

OTHER ALTERNATIVE EMBODIMENTS

Figure 21:
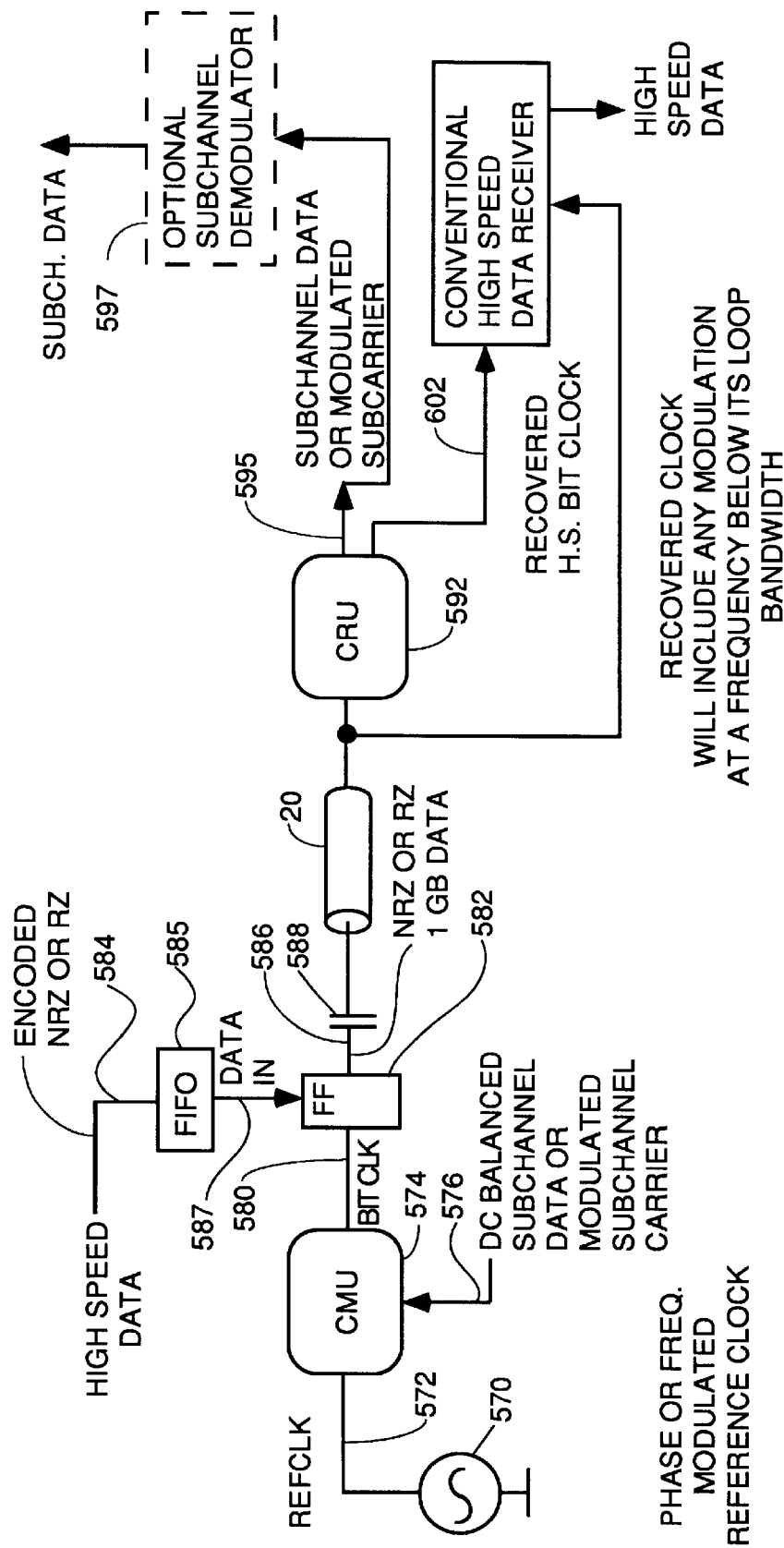
FIG. 21 shows an alternative subchannel embodiment in the proprietary link genus using modulation of the phase or frequency of the high speed data clock using the subchannel data.

FIG. 21 shows an alternative embodiment using modulation of the phase or frequency of the high speed data clock using the subchannel data. This species is in a subclass of clock modulation species within the proprietary link genus since it requires access to the high speed transmitter circuitry so as to modulate the high speed data clock before it is used to synchronize the high speed data to the bit times defined by the high speed clock. The characteristics of this subclass of clock modulation species are: either frequency or phase modulation of the high speed data clock with the subchannel data is used; either RZ or NRZ format high speed data can be sent; there is no need for a DC balanced encoding scheme, but the high speed data does need to be encoded in such a way that the clock can be recovered from the high speed data bitstream.

In this embodiment, a high speed data clock 570 generates a constant phase clock signal on line 572. A Clock Modulation Unit (CMU) 574 receives the constant phase clock signal on line 572 and receives the subchannel data on line 576. The CMU alters the phase or frequency of the clock signal in accordance with the subchannel data. These alterations are small enough in phase or frequency so as to prevent the phase locked loop in the clock recovery unit of the high speed data receiver from losing lock.

The resulting modulated clock signal is coupled via line 580 to the clock input of a flip flop 582. This flip flop receives at its data input via line 584 the encoded RZ or NRZ format high speed data bitstream from a FIFO buffer 585. The FIFO buffer is used because the clock rate of bit clock 570 normally matches the rate of generation of bits of the high speed data stream, but when the clock rate is modulated, there is slippage between the two rates. The FIFO functions to "take up the slack" when necessary. The FIFO presents data on line 587 in the order received such that the data is clocked into the data input port of flip flop 582 at the rate of the modulated bit clock on line 580 so as to be resynchronized with the bit clock on line 580 and then is presented on line 586. Because a sustained difference in the clock rate of clock 570 and the rate of generation of the high speed data bits would result in overflow or complete emptying of the FIFO, the subchannel data on line 576 is encoded so as to be DC balanced, or is modulated onto a subcarrier frequency so that the average clock frequency on line 580 is equal to the bit generation frequency of the high speed data source. If the subcarrier approach is used, the high speed data does not need to be DC balanced encoded because the high speed data Fourier spectrum frequency components do not affect the recovered clock phase in which the subchannel information is carried. However, regardless of whether a subcarrier is or is not used, the high speed data coding and transmission format must be compatible with the high speed data receivers in the system.

The flip flop 582 synchronizes the high speed data bitstream to the modulated clock and outputs the result on line 586. The resulting combined signal is AC coupled to the media via capacitor 588 and is injected into the shared media 20 using an appropriate media interface (not shown). Any of the media interface adapters previously described or direct injection (copper only) can be used.

Figure 22:
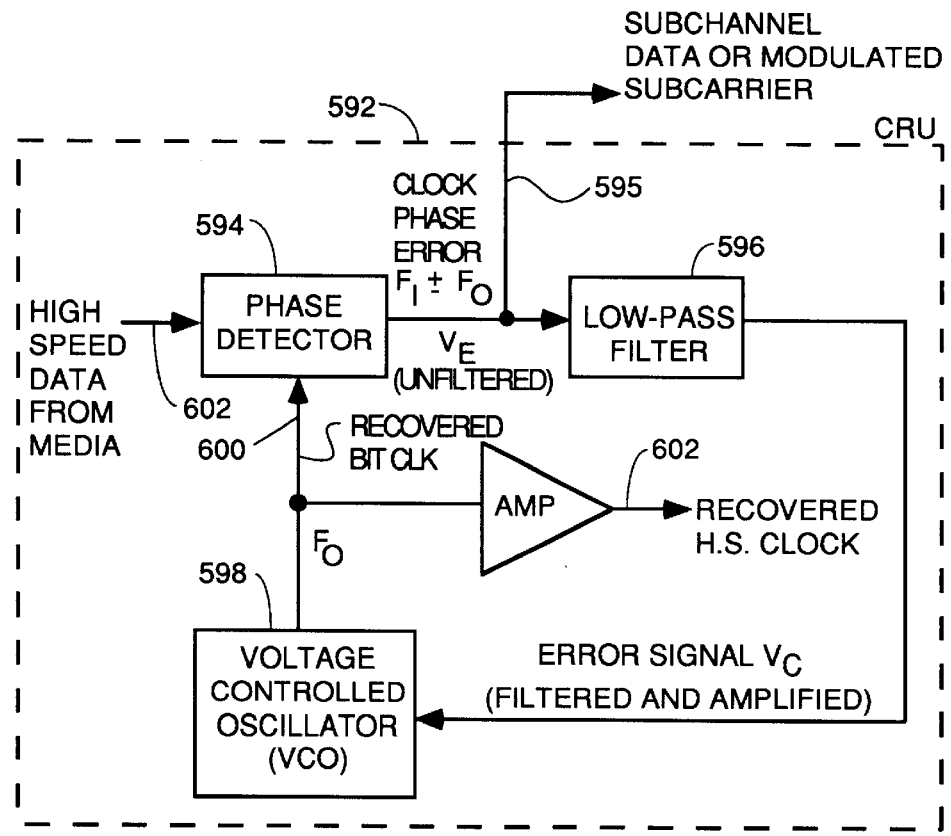
FIG. 22 is a block diagram of a phase locked loop clock recovery circuit which is used both to recover the high speed clock as well as the subchannel data for the transmitter of FIG. 21.

At the receiver end of the shared media, a conventional clock recovery unit (CRU) 592 receives the high speed data signals and recovers the clock signal using a.phase locked loop like that shown in FIG. 22. The phase locked loop has a control loop with a loop bandwidth which is large enough to include the Fourier spectrum of the subchannel modulation. That is, a phase detector 594 in the CRU PLL must be able to detect the highest rates of expected changes in phase or frequency in the high speed clock signal. Also, a low pass filter 596 must have a passband to pass substantially all the Fourier components in the error voltage on line 595 generated by the phase detector including the Fourier components in the low frequency range generated by the subchannel modulation. The low pass filter 596 is present to filter out high frequency products of the mixing of the frequencies of the output of a voltage controlled oscillator 598 on line 600 with the incoming noise corrupted NRZ or RZ format high speed data stream on line 602. The signal on line 600 is the recovered high speed data bit clock.

The phase detector detects the phase difference between the recovered high speed clock on line 600 and the transitions in the high speed data signal that occur on clock transitions at the transmit end. Because the passband of the low pass filter in the phase locked loop is selected such that the spectrum of phase or frequency changes in the bit clock caused by the subchannel data pass through the filter as part of the error signal output on line 595 by the phase detector, the error signal output by the phase detector is the encoded subchannel data or the modulated subchannel carrier. In the case where the subchannel data was DC balanced encoded, the subchannel data on line 595 can be used directly. However, in the case where the subchannel data was modulated onto a subcarrier, optional subchannel demodulator 597 is coupled to line 595 to recover the subchannel data. This causes the voltage controlled oscillator 598 of the phase locked loop to change its frequency of operation to track the phase changes in the clock signal encoded in the high speed data. Thus, the cleaned up recovered clock signal on line 602 will be phase modulated in accordance with the subchannel data.

The subchannel data is then recovered from the error signal on line 595 by decoding it or applying the modulated subchannel carrier to a subchannel demodulator.

Figure 23:
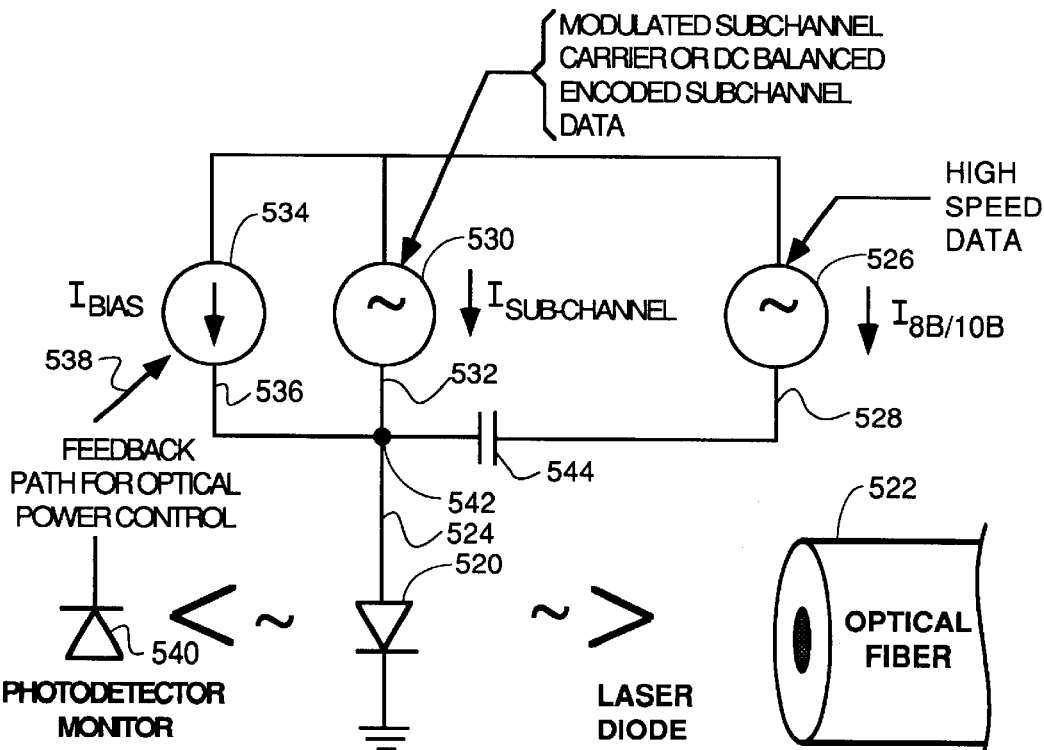
FIG. 23 schematically illustrates a subchannel species in the proprietary link genus having a transmitter structure to implement modulation of laser diode power simultaneously with subchannel data and high speed data.

FIG. 23 schematically illustrates a subchannel species in the proprietary link genus having a transmitter structure to implement modulation of laser diode power simultaneously with subchannel data and high speed data. In this embodiment, a laser diode 520 generates light the intensity of which is proportional to the current passing through the laser diode. The current on line 524 coupled to the anode of the laser diode is modulated by three current sources. Current source 526 outputs current on line 528 which is modulated in accordance with the high speed DC balanced data, e.g., 8b/10b data encoded NRZ baseband transitions. Current source 530 outputs current on line 532 which is modulated in accordance with either encoded subchannel baseband data which is DC balanced or a subcarrier in the 1 mHz frequency range which is modulated in any fashion with the subchannel data. Of course if AC coupling capacitors exist anywhere in the transmitter or receiver which would block the baseband subchannel data signal from getting through to the subchannel receiver, then a subchannel carrier modulated with the subchannel data must be used. This modulation can be phase, frequency or amplitude modulation. Further, the subcarrier signal on line 532 can be pulse position modulated, or QAM or QPSK modulation of two subcarriers at a frequency in the suppressed portion of the high speed data spectrum but separated in phase by 90 degrees may be used. Also, the signal on line 532 can be straight baseband subchannel data as well. Basically, any conventional modulation scheme will work to modulate the subcarrier, and a conventional demodulator may be used in the subchannel receiver after separating out the low frequency subcarrier from the high speed data using a low pass filter.

When the subchannel current on line 532 is summed with the high speed data current on line 528, the resulting light intensity variations would be the superposition of the low frequency subchannel signals and the high frequency transitions of the 8b/10b encoded NRZ or RZ baseband transitions. The resulting transmitted signal would be baseband 8b/10b encoded NRZ or RZ format data expressed as light intensity variations which have a baseline or reference level which varies with the subchannel data, as shown in FIG. 4.

Alternatively, the subchannel current source 530 can be used to generate a current the instantaneous value of which is used to multiply the high speed data current in line 528. If instead of summing the currents on lines 532 and 528, the high speed data pulse amplitudes were multiplied by the instantaneous value for the subchannel data or modulated subcarrier, the resulting transmitted signal would look like FIG. 5 and would be true amplitude modulation of the high speed data logic swing. Assuming that a proprietary link is in use with no digital buffers between the transmitter and the subchannel receiver, the subchannel data could be extracted by peak detecting the high speed data and integrating the output of the peak detector. The AM modulated high speed data is then passed through a digital buffer and applied to the input of the high speed data receiver.

Amplitude modulation of the logic swings of the 8b/10b encoded high speed data has the disadvantage that it creates jitter in the clock recovery function. The jitter results from the slight changes in the high speed data pulse widths at the reference voltage crossings of the high speed data pulses as the ramp slopes change with changing pulse amplitude. This can cause bit errors. However, the amount of interference can be minimized because of the high quality low loss 1 gHz transmission line that is being used to send the high speed data. Because losses are so low, and because step up transformers can be used at the receiver end (as soon as the signals are converted to the electrical domain in the optical fiber case), the amount of subchannel power that needs to be injected is minimal. Typically, 100–200 millivolt swings at the receiver are all that is needed to extract the subchannel data.

Alternatively to limiting the amplitude swings, a high speed data receiver which can tolerate the amount of jitter generated by subcarrier injection could be used. In another alternative, the subchannel signal could be removed from the combined signal prior to applying it to the high speed data receiver. In this species, the subchannel signal is recovered from the amplitude modulated high speed data signal and then an inverse of the subchannel signal generated such as by the technology used in noise canceling headsets. Then this inverse signal is summed with the amplitude modulated high speed data signal at a point upstream of the high speed data receiver input so as to remove the amplitude modulation and any resulting jitter. The high speed data signal with the subchannel signal removed is then applied to the high speed data receiver input.

Returning to the consideration of FIG. 23, the embodiment shown uses a summing approach because the currents from the three current sources sum at node 542 to drive the laser diode.

Because of the inherent low frequency noise of laser diodes, bias current source 534 modulates the current on line 536 in accordance with a feedback error signal on path 538. Laser diodes are unstable in terms of the light intensity they put out in the frequency range below 50 Hz, and they therefore need stabilization of their light intensity output absent any incoming drive signal just to quiet the quiescent signal down to an acceptable level of noise. This is done by the combination of a photodetector 540 and current source 534. The photodetector is positioned so as to sense the intensity of light output by the laser diode, and generates a signal proportional to that light intensity. This signal is used to generate an error signal on data path 538 which controls the amount of current injected into line 536 by the bias control current source 534. Because of the noisy nature of laser diodes at low frequencies where the subchannel signal will reside, forward error correction or Viterbi decoding can be used to reduce the bit error rate in the subchannel data. Further, higher error rates can usually be tolerated on the management and control channels because traffic volumes are lower. Therefore, larger numbers of retries do not adversely affect throughput enough to be a problem.

The three modulated currents on lines 528, 532 and 536 are summed at node 542 and the sum current drives laser diode 520. A DC blocking capacitor 544 couples the high speed DC balanced data modulated current on line 528 to node 542 while blocking the low frequency modulated currents on line 532 and 536 from entering line 528.

Figure 24:
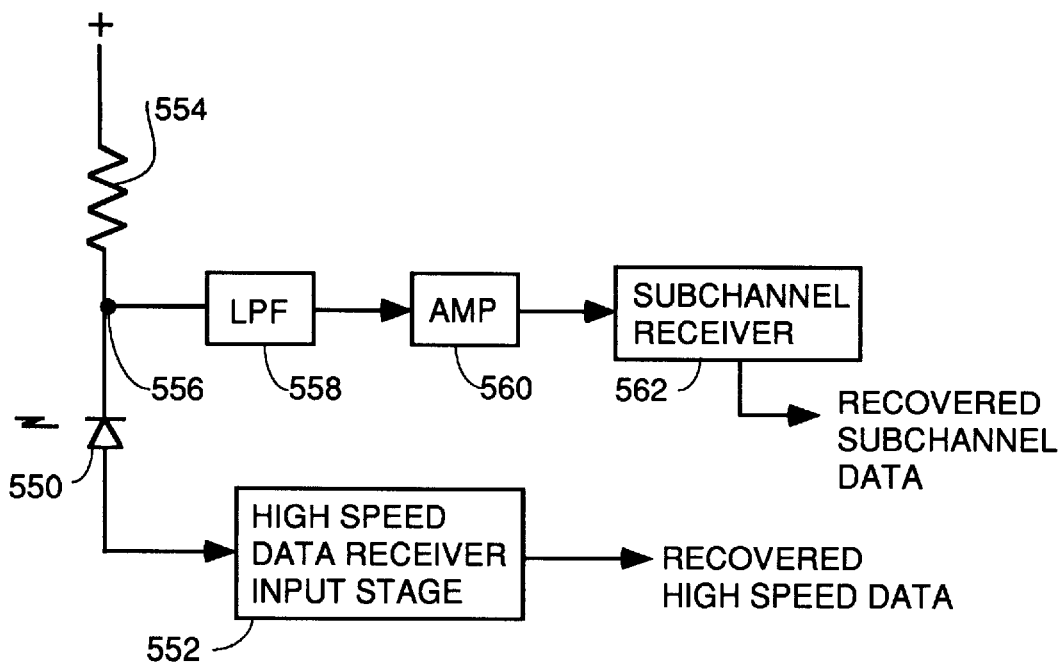
FIG. 24 represents a proprietary link receiver system for the transmitter design of FIG. 23.

FIG. 24 represents a proprietary link receiver system for the transmitter design of FIG. 23. A photodiode 550 senses the light pulses arriving from the shared media arid creates a current therethrough which varies with the intensity of the light pulses. A high speed data receiver with a low input impedance transconductance amplifier input stage (not shown) is connected to the anode of the photodiode to receive the combined signal and recover the high speed data therefrom. The cathode of the photodiode is coupled to a bias source through a biasing resistor. The current flow variations in resistor 554 caused by the light intensity variations in the fiber optic media are converted to voltage variations on node 556. Low pass filter 558 blocks high frequency components from the high speed data from reaching the narrowband subchannel receiver 562 through narrowband preamplifier 560. Optionally, a narrow bandwidth bandpass filter with a center frequency centered on the frequency of the subchannel carrier and an adequate bandwidth to include the subchannel spectrum may be inserted between the amplifier 560 and the subchannel receiver. The subchannel receiver includes a demodulator which is appropriate to whatever type of modulation is in use.

Figure 25:
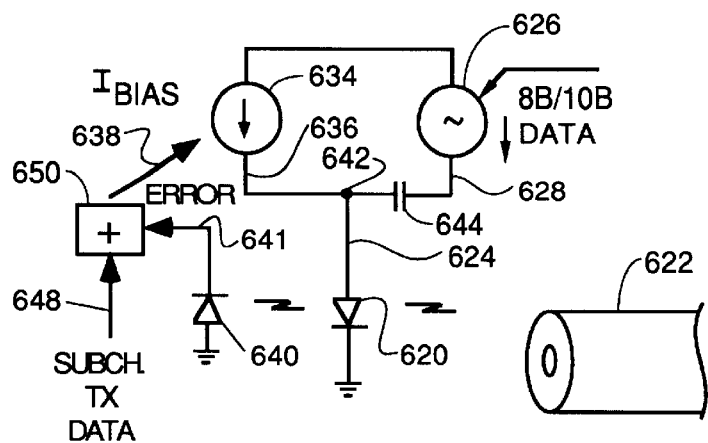
FIG. 25 represents an alternative embodiment for an optical subchannel transmitter wherein the subchannel information to be transmitted is injected into the bias control current source to alter the bias.

FIG. 25 represents an alternative embodiment for an optical subchannel transmitter wherein the subchannel information to be transmitted is injected into the bias control current source to alter the bias. Specifically, the laser diode 620 is driven by two currents one of which represents the high speed DC balanced 8b/10b encoded data on line 628, and the other of which represents the bias and subchannel data on line 636. Current source 634 generates a bias current which is modulated by the subchannel information and which varies with feedback information to stabilize the diode. Feedback information is generated as follows. Photodetector 640 picks up light intensity from the laser diode 620 and generates a proportional signal on line 641. This signal is summed with a signal on line 648 representing the subchannel transmit data in a summer 650. The subchannel data on line 648 is presented in DC balanced encoded form or as a subcarrier having a frequency in the portion of the suppressed spectrum of the high speed data and above the intrinsic laser diode noise is input on line 635 to a control port of current source 634, the subcarrier being angle modulated by the subchannel data. Of course if AC coupling capacitors exist anywhere in the transmitter or receiver which would block the baseband subchannel data signal from getting through to the subchannel receiver, then a subchannel carrier modulated with the subchannel data must be used.

The summer 650 is a simple summing junction. Alternatively, circuit 650 can be a differential amplifier which outputs error signal 638 as the difference between the signals on lines 641 and 648. The combination of the signals on lines 641 and 648 is output as the error signal on path 638 which controls the amount of current injected into line 636.

Figure 26:
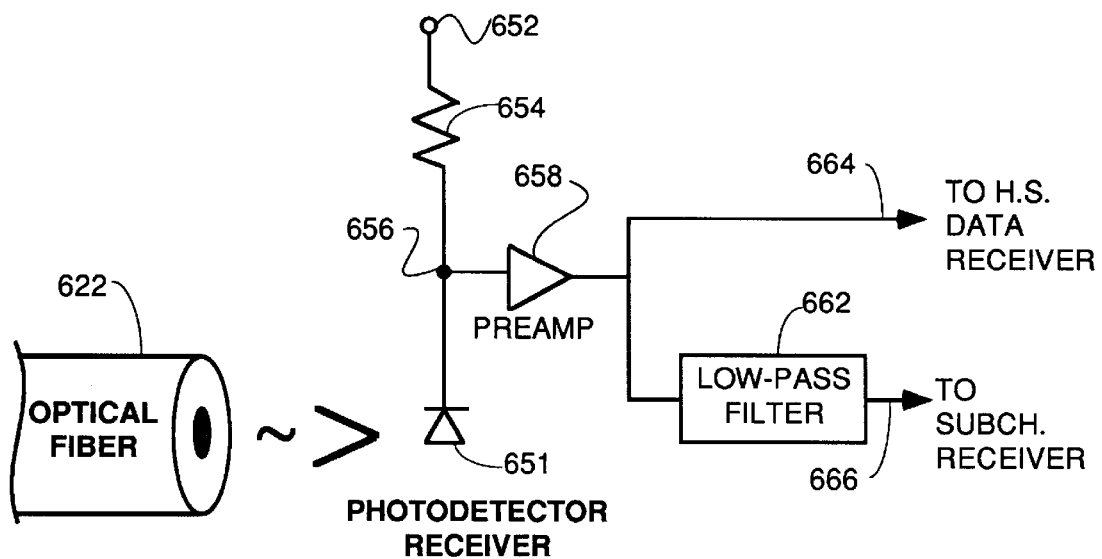
FIG. 26 represents a block diagram of an alternative receiver input network for a proprietary link where access to the media interface device design is available and where the shared media is an optical fiber.

FIG. 26 represents a block diagram of an alternative receiver input network for a proprietary link where access to the media interface device design is available and where, the shared media is an optical fiber. The modulated light waves exit fiber 622 and impinge upon photodetector diode 651. This diode is coupled to a bias voltage supply (not shown) coupled to node 652 through a load resistor 654 which controls the level of quiescent bias current. The changing light intensity causes variations in current through the load resistor which causes changing voltage at node 656. A wide bandwidth preamplifier 658 amplifies the voltage signal at node 656. The amplified signals are coupled directly to the input of a high speed data receiver (not shown) via line 664 and to the input of a subchannel receiver (not shown) through a low pass filter 662 and line 666. The low pass filter has a passband with sufficient bandwidth and an upper rolloff frequency selected so as to pass all of the Fourier spectral components in the subchannel spectrum but to heavily suppress the higher power high frequency components of the high speed data spectrum. The subchannel receiver includes a demodulator/decoder appropriate to whatever form of modulation or encoding of the baseband subchannel signal has.

Although a preferred embodiment and numerous alternative embodiments have been disclosed herein, those skilled in the art will appreciate still other embodiments and modifications that can be made without departing from the true spirit and scope of the invention. All such modifications, improvements and other embodiments are intended to be included within the scope of the claims appended hereto.

What is claimed is:

1. A system comprising:

a copper or fiber optic shared transmission media;

a high speed data transmitter having a data input for coupling to a source of date to be transmitted, for encoding data received at said high speed data input using a DC balanced data encoding scheme and outputting said encoded data in NRZ format at an output, said encoding being such that low frequency components in the Fourier spectrum of said encoded high speed data are heavily suppressed, said encoding scheme having a bounded transition density;

a summing junction coupled to receive the encoded NRZ format data signal output by said high speed data transmitter;

a subchannel transmitter for generating a subchannel carrier signal modulated with subchannel data and having an output coupled to said summing junction so as to generate a combined signal comprising the sum of said high speed data signal and said subchannel carrier signal, said subchannel transmitter having a data input for receiving subchannel data to be transmitted over said shared transmission media and using said subchannel data to modulate said subchannel data onto a subchannel carrier by frequency shift keying, said subchannel carrier having a frequency in the range of low frequencies that are heavily suppressed in the Fourier spectrum of said high speed data, said subchannel transmitter including means for controlling the injection current into said summing junction generated by said subchannel transmitter so as to generate an subchannel component in said combined signal which is strong enough to be detected but which is not so strong as to cause excessive jitter in any conventional high speed data receiver to which said combined signal is coupled;

a media interface driver means which is designed to drive the particular type of shared transmission media present and having an input coupled to said summing junction and having an output coupled to said shared transmission media, for driving the combined signal generated at said summing junction onto said shared transmission media;

a media interface converter means having an input coupled to said shared transmission media and having an output, for converting the combined signal on said shared transmission media into a signal at said output which can be coupled to the input of a conventional high speed data receiver;

a high speed data receiver having an input coupled to said media interface converter, for recovering said high speed data; and a low pass filter having an input coupled to said media interface converter output and having an output and having a passband which includes said subchannel carrier and which has a rolloff frequency set so as to heavily attenuate the high frequency Fourier components of the combined signal output by said media interface converter during passage through said low pass filter; and a subchannel receiver having an input coupled to said output of said low pass filter, for converting the frequency shifts in said subchannel carrier to logic levels so as to recreate said subchannel data.

2. The apparatus of claim 1 wherein said media interface driver means is GBIC media interface adapter with an active digital buffer adapted to driver fiber optic shared transmission media.

3. The apparatus of claim 1 wherein said media interface driver means is a fixed optical media interface driver.

4. The apparatus of claim 1 wherein said media interface driver means is a fixed copper media interface driver.

5. A system comprising:

a copper or fiber optic shared transmission media;

a high speed data transmitter having a data input for coupling to a source of data to be transmitted, for encoding data received at said high speed data input using a DC balanced data encoding scheme and outputting said encoded data in NRZ format at an output, said encoding being such that low frequency components in the Fourier spectrum of said encoded high speed data are heavily suppressed, said encoding scheme having a bounded transition density;

a summing junction coupled to receive the encoded NRZ format data signal output by said high speed data transmitter;

a subchannel transmitter for generating a subchannel carrier signal modulated with subchannel data and having an output coupled to said summing junction so as to generate a combined signal comprising the sum of said high speed data signal and said subchannel carrier signal, said subchannel transmitter having a data input for receiving subchannel data to be transmitted over said shared transmission media and using said subchannel data to modulate a subchannel carrier having a frequency in the range of low frequencies that are heavily suppressed in the Fourier spectrum of said high speed data, said subchannel transmitter including means for generating slid subchannel carrier signal so as to have an amplitude which is approximately 4.5 volts peak-to-peak, and further including a variable attenuator coupling said subchannel carrier signal to said summing junction while imposing a selectable one of a plurality of different attenuation factors on said subchannel carrier signal prior to injection into said summing junction, said attenuation factor being selected in accordance with the particular type of shared transmission media in use so as to generate a subchannel component in said combined signal which is strong enough to be detected by a subchannel receiver but which is not so strong as to cause excessive jitter in any conventional high speed data receiver to which said combined signal is coupled;

a media interface driver which is designed to drive the particular type of shared transmission media present and having an input coupled to said summing junction and having an output coupled to said shared transmission media, for driving the combined signal generated at said summing junction onto said shared transmission media;

a media interface converter means having an input coupled to said shared transmission media and having an output, for converting the combined signal on said shared transmission media into a signal at said output which can be coupled to the input of a conventional high speed data receiver;

a high speed data receiver having an input coupled to said media interface converter, for recovering said high speed data; and a low pass filter having an input coupled to said media interface converter output and having an output and having a passband which includes said subchannel carrier and which has a rolloff frequency set so as to heavily attenuate the high frequency Fourier components of the combined signal output by said media interface converter during passage through said low pass filter; and a subchannel receiver having an input coupled to said output of said low pass filter, for converting the frequency shifts in said subchannel carrier to logic levels so as to recreate said subchannel data.

6. The apparatus of claim 5 wherein said subchannel transmitter outputs a differential, frequency shift keyed subcarrier signal having a frequency of approximately 1 mHz, and wherein said means for generating said subchannel carrier signal so as to have a 4.5 volt peak-to-peak amplitude is a differential, emitter-coupled, analog voltage amplifier with an output impedance of approximately 390 ohms which outputs said subchannel carrier signal so as to have a frequency of approximately 1 mHz and a 4.5 volt peak-to-peak amplitude on each signal line, and wherein said high speed data transmitter has differential outputs at which are output said encoded NRZ format high speed data as a differential signal via two differential high speed data lines which couple said differential outputs of said high speed data transmitter to differential inputs on said GBIC media interface driver, and wherein said summing junction is a node on each of said two high speed data lines, and wherein said outputs of said differential, emitter-coupled, analog voltage amplifier are coupled to said summing junction through a pair of 2000 ohm resistors, and wherein said outputs of said differential, emitter-coupled, analog voltage amplifier are coupled to ground through shunt capacitors having capacitances of approximately 150 picofarads, and wherein said differential outputs of said high speed data transmitter are coupled to said summing junctions through a pair of resistors which have resistances of approximately 47 ohms each.

7. The apparatus of claim 6 wherein said GBIC media interface driver is adapted for optical media and includes a digital buffer with differential inputs and has a pair of AC coupling capacitors coupling said differential high speed data lines to said differential inputs of said digital buffer, and wherein said differential inputs of said digital buffer are coupled to ground through a pair of termination resistors having resistance values of approximately 75 ohms each.

8. The apparatus of claim 6 wherein said GBIC media interface driver is a passive copper media driver which couples the differential inputs of said GBIC media interface driver to said shared copper media.

9. The apparatus of claim 6 wherein said variable attenuator is a switch in series with a resistor having a resistance of approximately 390 ohms, the series combination being connected across said differential outputs of said emitter-coupled, analog voltage amplifier.

10. A system comprising:

a copper shared transmission media;

a high speed data transmitter having a data input for coupling to a source of data to be transmitted, for encoding data received at said high speed data input using a DC balanced data encoding scheme and outputting said encoded data in NRZ format at an output, said encoding being such that low frequency components in the Fourier spectrum of said encoded high speed data are heavily suppressed, said encoding scheme having a bounded transition density;

a summing junction coupled to receive the encoded NRZ format data signal output by said high speed data transmitter and coupled directly to said copper shared transmission media;

a subchannel transmitter for generating a subchannel carrier signal modulated with subchannel data and having an output coupled to said summing junction so as to generate a combined signal comprising the sum of said high speed data signal and said subchannel carrier signal, said subchannel transmitter having a data input for receiving subchannel data to be transmitted over said shared transmission media and using said subchannel data to modulate said subchannel carrier, said subchannel carrier having a frequency in the range of low frequencies that are heavily suppressed in the Fourier spectrum of said high speed data, said subchannel transmitter functioning to generate a subchannel signal in said combined signal which has a high enough amplitude to be detected over the Fourier components of said combined signal which are in the same frequency range as said subchannel carrier and other sources of noise but which is not so strong as to cause excessive jitter in any conventional high speed data receiver to which said combined signal is coupled where excessive jitter is defined as jitter which is high enough to either cause unacceptably high bit error rates in recovery of said high speed data signal or which cause loss of synchronization of any high speed data receiver coupled to said combined signal;

a high speed data receiver having an input coupled to said copper shared transmission media for recovering said high speed data; and a low pass filter having an input coupled to said media interface converter output and having an output and having a passband which includes said subchannel carrier and which has a rolloff frequency set so as to heavily attenuate the high frequency Fourier components of the combined signal output by said media interface converter during passage through said low pass filter; and a subchannel receiver having an input coupled to said output of said low pass filter, for converting the modulation in said subchannel carrier to logic levels so as to recreate said subchannel data.

11. A system comprising:

a copper shared transmission media;

a high speed data transmitter having a data input for coupling to a source of data to be transmitted, for encoding data received at said high speed data input using a DC balanced data encoding scheme and outputting said encoded data in NRZ format at a differential output with approximately a 1 gigabit bit rate, said encoding being such that low frequency components in the Fourier spectrum of said encoded high speed data in the frequency range of approximately 1 mHz are heavily suppressed, said encoding scheme having a bounded transition density between 0.3 and 1.0;

a fixed copper media interface driver having a digital buffer therein which is internally biased and having a differential input coupled to said differential outpul of said high speed data transmitter by first and second conductors ech with first and second AC coupling capacitors in series therewith, said first AC coupling capacitor having a value of approximately 150 picofarads and said second AC capacitor having a capacitance of approximately 0.001 microfarads, and having a differential output coupled to ground through a pair of resistor voltage dividers, each comprised of an approximately 47 ohm resistor coupled to the output of said interface driver and an approximately 100 ohm resistor coupled between the 47 ohm resistor and ground, each having a center tap node at the junction between the resistors, each center tap node for coupling to said copper shared transmission media by a pair of approximately 0.01 microfarad AC coupling capacitors;

a summing junction in said first conductors so as to receive one of the encoded NRZ format data differential signals output by said high speed data transmitter and coupled to one of the differential inputs of said fixed copper media interface driver, and wherein said AC coupling capacitor;

a subchannel transmitter for generating a subchannel carrier signal frequency shift keyed modulated with subchannel data having a center frequency of approximately 1 mHz and a peak-to-peak amplitude of approximately 2 volts, and having an output coupled to said summing junction so as to generate a combined signal comprising the sum of said high speed data signal and said subchannel carrier signal, said subchannel transmitter having a data input for receiving subchannel data to be transmitted over said shared transmission media and using said subchannel data to FSK modulate said subchannel carrier;

a high speed data receiver having an input coupled to said copper shared transmission media for recovering said high speed data; and a low pass filter having an input coupled to said media interface converter output and having an output and having a passband which includes said subchannel carrier and which has a rolloff frequency set at approximately 3 mHz so as to heavily attenuate the high frequency Fourier components of the combined signal output by said media interface converter during passage through said low pass filter; and a subchannel receiver having an input coupled to said output of said low pass filter, for converting the FSK modulation in said subchannel carrier to logic levels so as to recreate said subchannel data.

12. A data transmitter comprising:

first means for encoding high speed data using a DC balanced encoding scheme and outputting said encoded data in NRZ format;

a summing junction;

second means for modulating a subchannel carrier with subchannel data and injecting the modulated subchannel carrier into said summing junction.

13. The apparatus of claim 12 further comprising a media interface driver including a digital buffer coupling said summing junction to a shared transmission media, and wherein said second means injects enough subchannel carrier voltage to make the subchannel signal detectable at the receiver but not so much subchannel carrier voltage as to cause excessive jitter in any conventional high speed data receiver which receives the combined signal transmitted on said shared media.

14. A process for transmitting low speed data over a shared transmission media with high speed data, comprising:

generating a high speed data stream by encoding high speed data in such a way that the spectral energy content of said high speed data is low at low frequencies near the frequency of a subchannel carrier and supplying it to a summing junction in NRZ format;

modulating low speed data onto said subchannel carrier having a frequency in a suppressed low frequency portion of the spectrum of said encoded high speed data;

additively mixing said modulat ed subchannel carrier with said encoded high speed data by superposition; and coupling the combined signal onto a shared transmission media;

at a destination mode, recovering said high speed data;

filtering out most of the spectral energy of said high speed data and recovering said low speed data from the filtered signal;

wherein the frequency of said subchannel carrier is so much lower than the frequency of the high speed data that the superposition of said subchannel carrier on said high speed data carrier changes the voltage of the high and low levels of the high speed data in accordance with the amplitude of the subchannel carrier by superposition and simultaneously causes shifts in the time of crossing of a reference voltage at the leading and trailing edges of pulses of said high speed data signals caused by said level shifts, and wherein the step of recovering said low speed data includes the step of converting the changes in time of crossing of said reference voltage into recovered low speed data.

15. A process for transmitting low speed data over a shared transmission media with high speed data, comprising:

generating a high speed data stream by encoding high speed data in such a way that the spectral energy content of said high speed data is low at low frequencies near the frequency of a subchannel carrier and supplying it to a summing junction in NRZ format;

modulating low speed data onto said subchannel carrier having a frequency in a suppressed low frequency portion of the spectrum of said encoded high speed data;

additively mixing said modulated subchannel carrier with said encoded high speed data by superposition; and coupling the combined signal onto a shared transmission media;

at a destination mode, recovering said high speed data;

filtering out most of the spectral energy of said high speed data and recovering said low speed data from the filtered signal;

and wherein the step of additively mixing said modulated subchannel carrier with said encoded high speed data includes the step of adding the subchannel carrier voltage to encoded high speed data voltage waveform at a summing junction.

16. A process for transmitting low speed data over a shared transmission media with high speed data, comprising:

generating a high speed data stream by encoding high speed data in such a way that the spectral energy content of said high speed data is low at low frequencies near the frequency of a subchannel carrier and supplying it to a summing junction in NRZ format;

modulating low speed data onto said subchannel carrier having a frequency in a suppressed low frequency portion of the spectrum of said encoded high speed data;

additively mixing said modulated subchannel carrier with said encoded high speed data by superposition; and coupling the combined signal onto a shared transmission media;

at a destination mode, recovering said high speed data;

filtering out most of the spectral energy of said high speed data and recovering said low speed data from the filtered signal;

and wherein the step of encoding said high speed data comprises 8b/10b encoding the high speed data such that the power in the resulting Fourier spectral components starts to roll off at approximately 100 megahertz, and wherein the amplitude of the subchannel carrier is high enough relative to the amplitude of the Fourier components in the spectrum of the encoded high speed data in the frequencies near the subchannel carrier frequency such that reliable recovery of said low speed data can be achieved, and wherein the frequency and modulation of the subchannel carrier are such that Fourier spectrum of the modulated subchannel carrier is substantially contained within the passband of the transmission media.

17. A system for transmitting low speed subchannel data over the same transmission media as high media using separate carriers comprising:

a high speed data input;

a subchannel data input;

a shared copper or fiber optic transmission media;

a driver having an input and having an output coupled to said shared transmission media capable of driving either a copper or fiber optic media with suitable modifications;

a summing junction or summer having a plurality of inputs and an output coupled to said input of said driver;

a high speed data transmitter having an input coupled to said high speed data input and having an output coupled to one of said inputs of said summer;

a subchannel transmitter having an input coupled to said subchannel data input and having an output coupled to another input of said summing junction or summer and capable of driving a subchannel signal onto said shared transmission media said subchannel signal having characteristics of being detectable by a subchannel receiver but also not causing excessive jitter in any high speed data receiver which receives the signals from said shared transmission media;

a high speed data receiver having an input coupled either to said transmission media or to the output of a media interface circuit which has an input coupled to said shared transmission media and which is capable of converting signals on said media to electrical signals, and said high speed data receiver having a data output at which recovered high speed data is output;

a low pass filter having an input coupled either directly to said transmission media or to the output of a media interface circuit which has an input coupled to said shared transmission media and which is capable of converting signals on said media to electrical signals, said low pass filter having an output and having an upper roll off frequency set at a frequency to filter out most of the energy in the spectrum of said high speed data; and a subchannel receiver having an input coupled to said output of said low pass filter and having an output at which recovered subchannel data appears.

18. A system comprising:

a high speed bit clock;

a subchannel data source of DC balanced encoded subchannel data or a subcarrier having subchannel data modulated thereon;

a clock modulation circuit using having an input coupled to said clock and having an input for coupling to said subchannel data source;

a source of encoded NRZ or RZ format high speed data having a bit generation rate nominally equal to said bit clock frequency;

a FIFO memory having an input coupled to receive said high speed data and having an output;

a flip flop having a clock input coupled to receive a modulated clock signal from said clock modulation circuit and having a data input coupled to said output of said FIFO and having an output at which the high speed data appears resynchronized with said modulated clock signal.

19. The apparatus of claim 18 further comprising: means for coupling said resynchronized high speed data signal into a shared transmission media.

20. The apparatus of claim 19 further comprising:

a clock recovery unit coupled to receive said resynchronized high speed data signal and having an output at which a recovered high speed bit clock signal appears and an output at which a subchannel data or modulated subcarrier signal appears; and a high speed data receiver circuit having an input coupled to said output at which said recovered high speed clock appears and having an input coupled to receive signals from said shared transmission media.

21. The apparatus of claim 20 further comprising a subchannel demodulator coupled to received said modulated subcarrier signal.

22. The apparatus of claim 20 wherein said clock recovery unit is a phas lock loop.

23. A subchannel data transmitter comprising:

a laser diode;

bias means for generating a variable bias current which stablizes the output of said laser diode;

first means for generating a drive current which represents DC balanced encoded NRZ or RZ format high speed data;

second means for generating a drive current which represents a subcarrier modulated with subchannel data or DC balanced encoded subchannel data; and means for summing the currents generated by said bias means, said first means and said second means and using the summed current to drive said laser;

and further comprising:

a photodiode;

a high speed data receiver coupled to said photodiode;

a bias resistor for coupling the cathode of said photodiode to a source of bias voltage;

a low pass filter having an input coupled to the cathod of said photodiode and having an output; and a subchannel receiver coupled to the output of said photodiode.

* * * * *